US011323639B2

(12) United States Patent
Cho et al.

(10) Patent No.: US 11,323,639 B2
(45) Date of Patent: May 3, 2022

(54) IMAGE SENSOR AND OPERATION METHOD THEREOF

(71) Applicant: SAMSUNG ELECTRONICS CO., LTD., Suwon-si (KR)

(72) Inventors: Soonik Cho, Seoul (KR); Minji Hwang, Seongnam-si (KR); Seungjin Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/999,586

(22) Filed: Aug. 21, 2020

(65) Prior Publication Data
US 2021/0099656 A1    Apr. 1, 2021

(30) Foreign Application Priority Data

Sep. 27, 2019    (KR) .................. 10-2019-0119775

(51) Int. Cl.
*H04N 5/341*    (2011.01)
*H04N 5/374*    (2011.01)

(52) U.S. Cl.
CPC ............. *H04N 5/341* (2013.01); *H04N 5/374* (2013.01)

(58) Field of Classification Search
CPC ...... H04N 5/341; H04N 5/374; H04N 5/3595; H04N 5/3745; H04N 5/378; H04N 5/357; H04N 5/365; H04N 5/369; H01L 27/14609
See application file for complete search history.

(56) References Cited

U.S. PATENT DOCUMENTS

| | | | |
|---|---|---|---|
| 9,848,140 B2 | 12/2017 | Deng et al. | |
| 10,165,210 B1 | 12/2018 | Wang et al. | |
| 2005/0174454 A1 | 8/2005 | Ahn et al. | |
| 2006/0279650 A1 | 12/2006 | Watanabe et al. | |
| 2017/0126997 A1* | 5/2017 | Ha | ..................... H04N 5/37457 |
| 2019/0007632 A1 | 1/2019 | Kim et al. | |
| 2019/0082133 A1* | 3/2019 | Shikina | ............... H04N 5/3741 |
| 2020/0007808 A1 | 1/2020 | Jung et al. | |

FOREIGN PATENT DOCUMENTS

| | | |
|---|---|---|
| JP | 2000-022118 | 1/2000 |
| JP | 2013-247375 | 12/2013 |
| JP | 2014-042211 | 3/2014 |
| KR | 10-1209506 | 12/2012 |

* cited by examiner

*Primary Examiner* — Yogesh K Aggarwal

(74) *Attorney, Agent, or Firm* — F. Chau & Associates, LLC

(57) ABSTRACT

An image sensor and an operation method of the image sensor are disclosed. The image sensor includes a pixel array and a row driver. The pixel array includes a first pixel and a second pixel. Each of the first pixel and the second pixel includes at least one photosensitive element and a switching element configured to transfer charges generated by the at least one photosensitive element to a floating diffusion node. The first pixel and the second pixel are connected to a same column line. The row driver is configured to provide a clamping control signal to the switching element in the first pixel. The clamping control signal transits from a first level to a second level that is less than the first level, during a read period of the second pixel.

19 Claims, 19 Drawing Sheets

IMAGE SENSOR AND OPERATION METHOD THEREOF

CROSS-REFERENCE TO RELATED APPLICATION

This U.S. non-provisional patent application claims the benefit of priority under 35 U.S.C. § 119 to Korean Patent Application No. 10-2019-0119775, filed on Sep. 27, 2019, in the Korean Intellectual Property Office, the disclosure of which is incorporated by reference in its entirety herein.

BACKGROUND

1. Technical Field

The inventive concept relates to an image sensor and an operation method thereof, and more particularly, to an image sensor for generating a pixel signal based on a plurality of pixels and an operation method thereof.

2. Discussion of Related Art

An image sensor is a device that detects and conveys information used to generate an image of an object. Some image sensors are capable of generating two-dimensional or three-dimensional images of objects. The image sensors may generate an image of the object by using a photosensitive element that reacts according to the intensity of light reflected from the object. A complementary metal-oxide semiconductor (CMOS) image sensor includes a plurality of photosensitive pixels. A charge from each pixel is converted to voltages that represent an image of the object.

SUMMARY

At least one embodiment of the inventive concept provides an image sensor for preventing an excessive decrease in a pixel signal output from a pixel and an operation method thereof.

According to an exemplary embodiment of the inventive concept, there is provided an image sensor including a pixel array and a row driver. The pixel array includes a first pixel and a second pixel. Each of the first pixel and the second pixel includes at least one photosensitive element and a switching element configured to transfer charges generated by the at least one photosensitive element to a floating diffusion node. The first pixel and the second pixel are connected to a same column line. The row driver is configured to provide a clamping control signal to the switching element in the first pixel. The clamping control signal transits from a first level to a second level that is less than the first level, during a read period of the second pixel.

According to an exemplary embodiment of the inventive concept, there is provided an image sensor including a pixel array, a row driver, a voltage generation circuit, a ramp signal generator, an analog-to-digital converter (ADC), and a timing generator. The pixel array includes a first pixel and a second pixel connected to a same column line. The row driver is configured to provide control signals to the pixel array. The voltage generation circuit is configured to provide driving voltages to the row driver for driving the first and second pixels. The ramp signal generator is configured to generate a ramp signal. The analog-to-digital converter (ADC) is configured to convert a pixel voltage received from the column line into a pixel data value based on the ramp signal. The timing generator is configured to control the row driver, the ramp signal generator, and the ADC. The row driver sequentially applies a clamping control signal of a first level and of a second level that is less than the first level to a switching element in the first pixel.

According to an exemplary embodiment of the inventive concept, there is provided an operation method of an image sensor including a pixel array including first and second pixels arranged in different rows and connected to a same column line. The operation method includes resetting the pixel array; applying a clamping control signal decreasing from a first level to a second level to the first pixel during a reset counting period when a read operation on the second pixel is performed; and applying a transfer control signal of an activation level to the second pixel during a signal transfer period after the reset counting period.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

Hereinafter, exemplary embodiments of the inventive concept will be described in detail with reference to the accompanying drawings.

Figure 1:
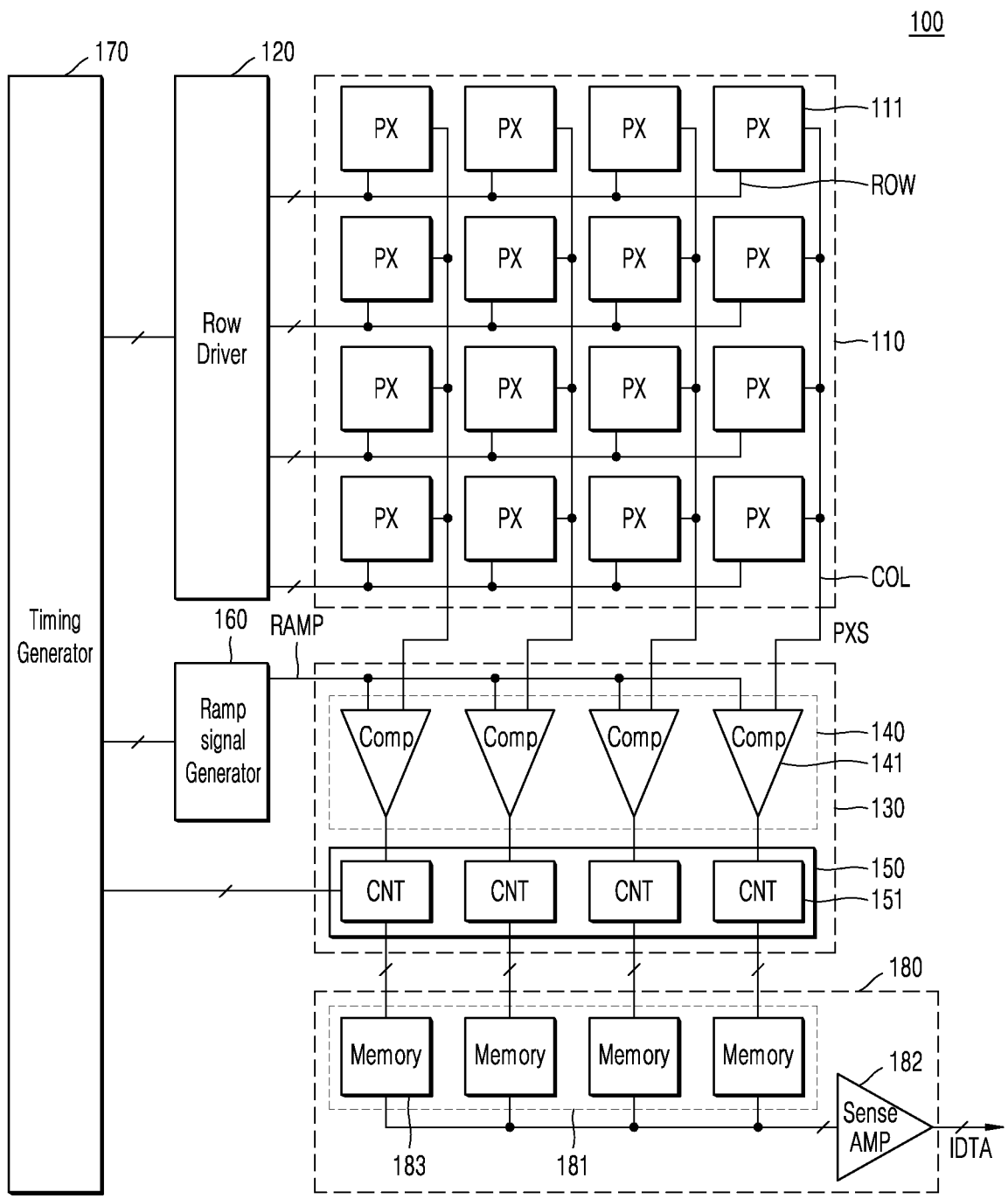
FIG. 1 is a block diagram of an image sensor according to an exemplary embodiment of the inventive concept.

FIG. 1 is a block diagram of an image sensor 100 according to an exemplary embodiment of the inventive concept.

The image sensor 100 may be included in an electronic device having an image or photo sensing function. For example, the image sensor 100 may be mounted on electronic devices such as a camera, a smartphone, a wearable device, an Internet of Things (IoT) device, a home appliance, a tablet personal computer (PC), a personal digital assistant (PDA), a portable multimedia player (PMP), a navigation machine, a drone, or an advanced drivers assistance system (ADAS). In addition, the image sensor 100 may be mounted on an electronic device included as a component in vehicles, furniture, manufacturing facilities, doors, or various kinds of metering instruments.

Referring to FIG. 1, the image sensor 100 includes a pixel array 110, a row driver 120 (e.g., a driver circuit), an analog-to-digital converter (ADC) 130 (e.g., an ADC converter circuit), a ramp signal generator 160, a timing generator 170 (e.g., a signal generator), and a buffer 180 (e.g., a buffer circuit). The ADC 130 includes a comparison block 140 (e.g., a comparison circuit) and a counter block 150 (e.g., a counter circuit).

The pixel array 110 includes a plurality of row lines ROW, a plurality of column lines COL, and a plurality of pixels 111 arranged in a matrix, each pixel 111 being connected to the plurality of row lines ROW and column lines COL. Although FIG. 1 shows that the pixel array 110 includes 16 pixels 111 arranged in four rows by four columns, this is for convenience of description, and the pixel array 110 may include a greater number of pixels.

Each of the plurality of row lines ROW extends in a row direction and may be connected to pixels arranged in the same row. For example, three row lines ROW may be connected to pixels 111 arranged in the same row, the three row lines ROW may transfer a control signal output from the row driver 120 to a reset transistor, a transfer transistor, and a select transistor, respectively, to be described below with reference to FIG. 2. Each of the plurality of column lines COL extends in a column direction and may be connected to pixels 111 arranged in the same column. Each of the plurality of column lines COL may output a pixel signal PXS to the ADC 130.

Each of the plurality of pixels 111 includes a photosensitive element (or photoelectric conversion element). For example, the photosensitive element may include a photodiode, a phototransistor, a photogate, or a pinned photodiode. Each of the plurality of pixels 111 may include at least one photosensitive element, and according to an embodiment of the inventive concept, each of the plurality of pixels 111 includes a plurality of photosensitive elements. The plurality of photosensitive elements may be arranged on the same layer or stacked in a vertical direction.

A microlens for concentrating light may be arranged above each of the plurality of pixels 111 or above each of a plurality of pixel groups including adjacent pixels 111. Each of the plurality of pixels 111 may sense light of a particular spectral band from light received through the microlens. For example, the pixel array 110 may include a red pixel configured to convert light of a red spectral band into an electrical signal, a green pixel configured to convert light of a green spectral band into an electrical signal, and a blue pixel configured to convert light of a blue spectral band into an electrical signal. A color filter for transmitting light therethrough of a particular spectral band may be arranged above each of the plurality of pixels 111. However, the pixel array 110 is not limited thereto, and the pixel array 110 may include pixels configured to convert light of a different spectral band besides red, green, and blue into an electrical signal.

According to an exemplary embodiment of the inventive concept, the plurality of pixels 111 have a multi-layer structure. A pixel 111 of the multi-layer structure may include stacked photosensitive elements configured to convert pieces of light of different spectral bands into electrical signals respectively corresponding to different colors. In other words, one pixel 111 may output electrical signals corresponding to a plurality of colors.

The plurality of pixels 111 may sense light by using a photosensitive element and convert the sensed light into a pixel signal PXS (e.g., a pixel voltage) that is an electrical signal. For example, the plurality of pixels 111 may emit a lot of electrons (photocharges) when bright light is applied thereto. The brighter the light, the less a voltage value output from a photosensitive element. When an output voltage value is excessively low, various types of noise including band noise may occur.

The row driver 120 may select at least one row line ROW of the pixel array 110 according to a control signal (e.g., a row address signal) received from the timing generator 170. Pixels 111 connected to the selected at least one row line ROW may output pixel signals PXS. For example, the pixel signal PXS may have any one of a voltage corresponding to a reset state, a voltage corresponding to photocharges, and a clamping voltage.

The row driver 120 may drive the pixel array 110 in row units and control a read operation of a pixel 111. Hereinafter, a read operation may indicate an operation of resetting a pixel and outputting a pixel signal PXS of an amplitude corresponding to a photocharge amount from the pixel. The row driver 120 may control a read operation of the pixel array 110 by outputting control signals to the plurality of pixels 111 through the plurality of row lines ROW. A selected row, on which a read operation is performed, is referred to as a read row, and the other rows are referred to as unread rows. A pixel, on which the read operation is performed, is referred to as a read pixel, and the other pixels are referred to as unread pixels.

According to an exemplary embodiment of the present embodiment, the row driver 120 controls pixels 111 of an adjacent unread row so as to operate as a clamping circuit when a read operation is performed on pixels 111 of a read row. The clamping circuit may prevent a voltage of a column line COL, i.e., a level of a pixel signal PXS (e.g., a pixel voltage), from being less than a certain level. For example, when a read operation is performed on pixels 111 of a third row among first to fourth rows in the pixel array 111, the row driver 120 controls pixels 111 of an adjacent unread row, e.g., the second row, so as to operate as a clamping circuit. According to an exemplary embodiment of the inventive concept, pixels 111 of a row or of a dummy row, on which a read operation has ended within one frame period, operate as a clamping circuit. Hereinafter, in at least one embodiment of the inventive concept, pixels operating as a clamping circuit are referred to as clamping pixels, and rows including a clamping pixel are referred to as clamping rows.

According to an embodiment of the inventive concept, the row driver 120 provides a clamping control signal to pixels 111 of an unread row. The row driver 120 may provide a clamping control signal through a row line ROW connected to the pixels 111 of the unread row. In an exemplary embodiment, the clamping control signal transits from a first level to a second other level at one time point when a read operation is performed on pixels 111 of a read row. In an exemplary embodiment, the second level is less than the first level, and the clamping control signal transits from the first level to the second level during a reset counting period or before a charge transfer period among a plurality of sub-periods in a read period.

When a read operation is performed on pixels 111 of a read row, the row driver 120 provides a transfer control signal to each of the pixels 111 of the read row through a row line ROW connected to the pixels 111 of the read row and provides a clamping control signal to each of pixels 111 of an adjacent unread row through a row line ROW connected to the pixels 111 of the unread row.

According to an exemplary embodiment of the inventive concept, the transfer control signal and the clamping control signal are input to a driving terminal of a charge transfer element (e.g., a gate terminal of a transfer transistor) included in each pixel 111. For example, the transfer control signal may be input to gate terminals of transfer transistors included in pixels 111 of a read row, and the clamping control signal may be input to gate terminals of transfer transistors included in pixels 111 of at least one unread row adjacent to the read row.

In an exemplary embodiment, a ramp signal generator 160 generate a ramp signal RAMP. The ramp signal RAMP may be a signal having a voltage that increase according to a constant slope or gradient. The ramp signal generator 160 may operate based on a ramp control signal provided from the timing generator 170. The ramp control signal may include at least one of a ramp enable signal and a mode signal. When the ramp enable signal is activated, the ramp signal generator 160 may generate a ramp signal having a gradient set based on the mode signal.

The ADC 130 converts a pixel signal PXS (i.e., an analog signal) received from the pixel array 110 into a digital signal. For example, the ADC 130 may generate a comparison result by comparing the pixel signal PXS to the ramp signal RAMP in order to effectively detect a difference between a reset signal and an image signal. The ADC 130 may count a signal output as the comparison result to convert the pixel signal PXS into a digital signal.

The comparison block 140 may include a plurality of comparison circuits 141, and each of the plurality of comparison circuits 141 may compare the ramp signal RAMP to a pixel signal PXS received through a corresponding column line COL to output a comparison result.

The comparison circuit 141 may generate a comparison result signal to which a correlated double sampling scheme is applied and may be referred to as a correlated double sampling circuit. Pixel signals PXS output from the plurality of pixels 111 may have a deviation due to pixel-unique characteristics (e.g., fixed pattern noise (FPN) and the like) which each pixel has and/or a deviation due to a characteristic difference in a logic for outputting a pixel signal PXS from a pixel 111. Obtaining a reset component (or reset signal) and an image component (or image signal) for each pixel signal and extracting a difference therebetween as an effective signal component to compensate for these deviations between pixel signals PXS is referred to as correlated double sampling. The comparison circuit 141 may output a comparison result signal to which the correlated double sampling scheme is applied.

The counter block 150 may include a plurality of counters 151 (e.g., counting circuits). The plurality of counters 151 may be connected to output ends of the comparison circuits 141 to count based on outputs of the comparison circuits 141, respectively. A counter control signal received from the timing generator 170 may include at least one of a counter clock signal, a counter reset signal for controlling a reset operation of the plurality of counters 151, and an invert signal for inverting internal bits of each of the plurality of counters 151. The counter block 150 may output a digital signal by counting a comparison result signal according to the counter clock signal.

The buffer 180 may include a column memory block 181 and a sense amplifier 182, and the column memory block 181 may include a plurality of memories 183. The plurality of memories 183 may temporarily store digital signals (e.g., pixel data) output from the plurality of counters 151, respectively, and then output the stored digital signals to the sense amplifier 182. The sense amplifier 182 may sense and amplify the digital signals output from the plurality of memories 183. The sense amplifier 182 may output the amplified digital signals as image data IDTA.

The timing generator 170 may generally control the image sensor 100. For example, the timing generator 170 may control operations or timings of the row driver 120 and the ADC 130 by transferring a control signal or a clock signal to each of the row driver 120 and the ADC 130.

When excessive light is applied to the pixel array 110 such that an output value (i.e., a level of a pixel signal PXS) of a pixel 111 is excessively low, a current source for sinking a current from a column line COL to which the pixel 111 is connected may be turned off. When a plurality of current sources in the same row are turned off, a change in current consumption and a resulting change in a power source voltage may occur, thereby causing band noise. However, as described above, in the image sensor 100 according to an exemplary embodiment of the inventive concept, the row driver 120 operates pixels of an unread row as a clamping circuit, thereby preventing a level of a pixel signal PXS from being excessively low. Therefore, the image sensor 100 according to an exemplary embodiment of the inventive concept may suppress the occurrence of band noise.

In addition, because the row driver 120 may use pixels of at least one unread row as clamping pixels when a read operation on read pixels is performed without an additional wiring or circuit on the pixel array 110, an additional circuit area or power consumption is not required.

Figure 2:
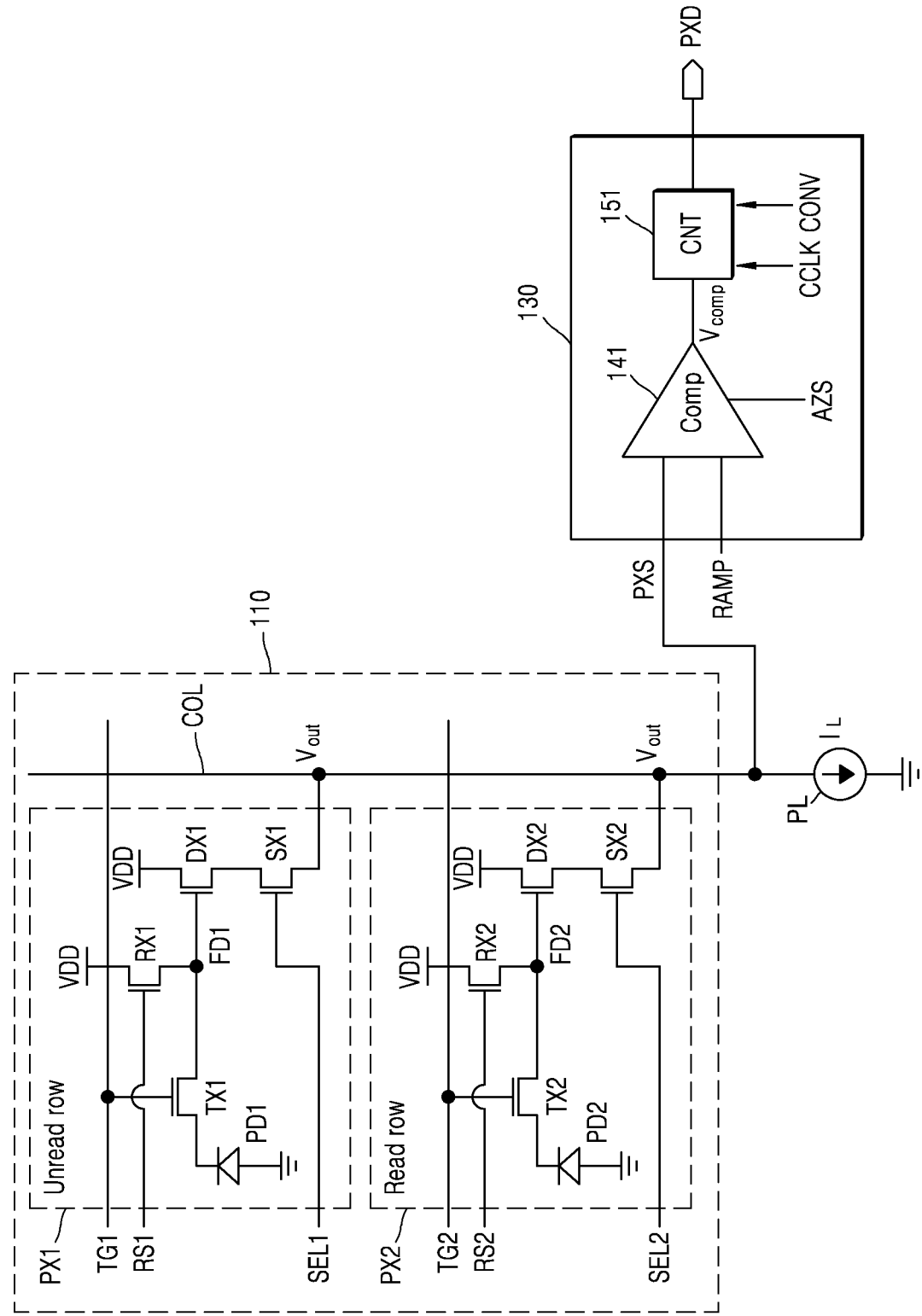
FIG. 2 is a circuit diagram of a pixel array and an analog-to-digital converter (ADC) according to an exemplary embodiment of the inventive concept.

FIG. 2 is a circuit diagram of the pixel array 110 and the ADC 130, according to an exemplary embodiment of the inventive concept.

Referring to FIG. 2, the pixel array 110 includes a first pixel PX1 and a second pixel PX2 connected to the same column line COL. The first pixel PX1 and the second pixel PX2 are located in different rows. For example, the first pixel PX1 and the second pixel PX2 may be located in adjacent rows. However, the first pixel PX1 and the second pixel PX2 are not limited thereto, and at least one other pixel may be located between the first pixel PX1 and the second pixel PX2. Although FIG. 2 shows only one pixel included in each row for convenience of description, a plurality of other pixels may be included in each row as shown in FIG. 1. The pixel array 110 operates in row units, and thus, operations of the plurality of other pixels may be similar to operations of the first pixel PX1 and the second pixel PX2.

Referring to FIG. 2, the first pixel PX1 and the second pixel PX2 includes reset transistors RX1 and RX2, transfer transistors TX1 and TX2, drive transistors DX1 and DX2, select transistors SX1 and SX2, and photodiodes PD1 and PD2, respectively. The reset transistors RX1 and RX2, the transfer transistors TX1 and TX2, and the select transistors SX1 and SX2 may be turned on or off in response to a received control signal and thus operate as a switching element. The photodiodes PD1 and PD2 may be replaced with other photosensitive elements. Control signals may be transferred to the reset transistors RX1 and RX2, the transfer transistors TX1 and TX2, and the select transistors SX1 and SX2 of the first pixel PX1 and the second pixel PX2 through a plurality of row lines (ROW of FIG. 1), and in this case, the plurality of row lines ROW may extend in a row direction on the pixel array 110 and may be connected to pixels arranged in the same row.

Operations of the first pixel PX1 and the second pixel PX2 are described based on the first pixel PX1 as an example. When a read operation on the first pixel PX1 is performed, the photodiode PD1 variably generates photocharges according to the intensity of incident light. The transfer transistor TX1 transfers the photocharges to a floating diffusion node FD1 according to a transfer control signal TG1 output from a row driver (120 of FIG. 1). For example, the transfer control signal TG1 is applied to a gate terminal of the transfer transistor TX1. The drive transistor DX1 may amplify the photocharges and transfer the amplified photocharges to the select transistor SX1, according to a potential of the photocharges accumulated in the floating diffusion node FD1. For example, a gate terminal of the drive transistor DX1 may receive a signal from the diffusion node FD1 having a voltage corresponding to the potential. When a drain terminal of the select transistor SX1 is connected to a source terminal of the drive transistor DX1 and the select transistor SX1 is turned on in response to a select signal SEL1 output from the row driver 120, an output signal Vout of a level corresponding to a voltage level of the floating diffusion node FD1 may be output to a column line COL connected to the first pixel PX1. For example, the select signal SEL1 may be output to a gate terminal of the select transistor SX1. The reset transistor RX1 may reset the floating diffusion node FD1 based on a power source voltage VDD according to a reset signal RS1 provided from the row driver 120. For example, the reset signal RS1 may be applied to a gate terminal of the reset transistor RX1 to apply the power source voltage VDD to the floating diffusion node FD1.

When the row in which the second pixel PX2 is disposed is a read row, the row in which the first pixel PX1 is disposed is a unread row, and the first pixel PX1 operates as a clamping pixel for the second pixel PX2, a clamping control signal (CG of FIG. 4) is applied to the transfer transistor TX1, and the voltage level of the floating diffusion node FD1 in the first pixel PX1 may be changed in response to the clamping control signal CG. For example, the clamping control signal may be applied to a gate terminal of the transfer transistor TX1. In this case, the voltage level of the floating diffusion node FD1 is irrelevant to the photocharges generated by the photodiode PD1 and may be determined based on a change in a level (voltage level) of the clamping control signal CG. The select transistor SX1 may output the output signal Vout of the level corresponding to the voltage level of the floating diffusion node FD1 in response to the select signal SEL1

A current source PL is connected to one end of the column line COL, and the current source PL may sink a load current $I_L$ from the column line COL. The current source PL may be referred to as a pixel load. In an exemplary embodiment, the current source PL is implemented by an electronic circuit that absorbs an electric current independent of a voltage across the current source.

A pixel signal PXS output from the first pixel PX1 or the second pixel PX2 may be provided to the ADC 130 through the column line COL. The ADC 130 includes a comparison circuit 141 (e.g., an operational amplifier) and a counter 151 (e.g., a counting circuit). Although FIG. 2 shows one comparison circuit 141 and one counter 151 connected to one column line COL for convenience of description, as described with reference to FIG. 1, the ADC 130 may include a plurality of comparison circuits 141 and a plurality of counters 151 connected to a plurality of column lines COL.

The comparison circuit 141 may be implemented using at least one comparator. For example, the comparator may include a differential amplifier, an operational transconductance amplifier (OTA), or a source follower. According to an embodiment of the inventive concept, capacitors are connected to two input terminals of the comparison circuit 141. The comparison circuit 141 may compare the received pixel signal PXS to a ramp signal RAMP to generate a comparison result and output the comparison result. The counter 151 may count an output Vcomp of the comparison circuit 141 based on a counting clock signal CCLK and an invert signal CONV to generate a counting result and output the counting result as pixel data PXD. The pixel data PXD may have an image component in which a reset component is removed from the pixel signal PXS, i.e., a digital value corresponding to an image signal.

Figure 3:
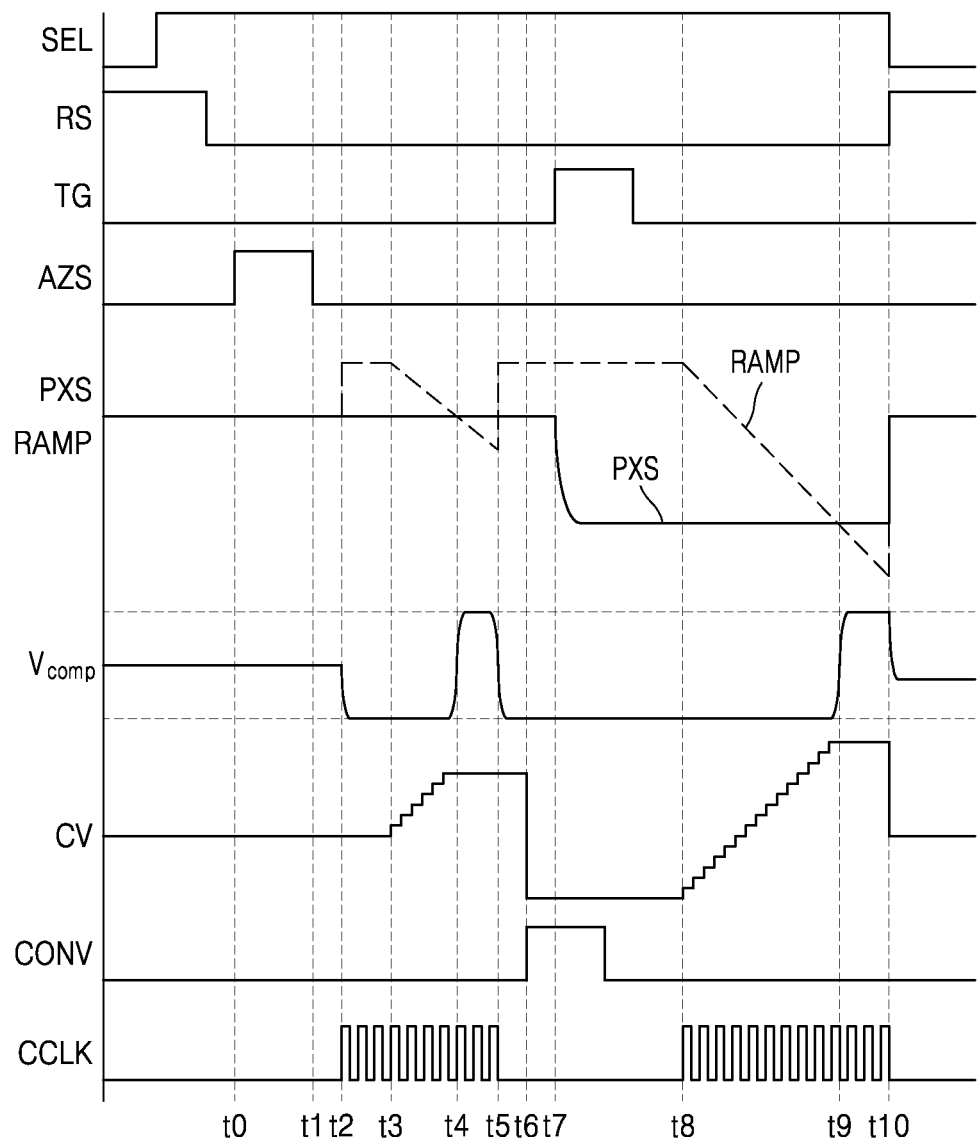
FIG. 3 is a graph illustrating a read operation performed on a pixel.

FIG. 3 is a graph illustrating a read operation performed on a pixel.

A select signal SEL, a reset signal RS, and a transfer control signal TG shown in FIG. 3 are control signals applied to a pixel on which a read operation is performed. For example, it is assumed that a read operation on the first pixel PX1 of FIG. 2 is performed.

Referring to FIGS. 2 and 3, before a time point t0, the reset signal RS of a high level is applied to the reset transistor RX1, and the floating diffusion node FD1 is reset based on the power source voltage VDD. For example, a voltage level of the floating diffusion node FD1 may be the same as a level of the power source voltage VDD.

The read operation is performed from the time point t0 to a time point t10. When the read operation is performed, the select signal SEL maintains the high level by which the select transistor SX1 is turned on, and the reset signal RS maintains a low level by which the reset transistor RX1 is turned off.

A period between the time point t0 and a time point t1 may be referred to as an auto-zero period, and a period between the time point t1 and the time point t10 may be referred to as a comparison operation period. An auto-zero signal AZS is activated from the time point t0 to the time point t1, and the comparison circuit 141 may be initialized in response to the auto-zero signal AZS. For example, input terminals and/or output terminals of the comparator included in the comparison circuit 141 may have the same level. For reset counting, e.g., counting a reset signal of the pixel PX1, an offset may be applied to the ramp signal RAMP at a time point t2, and then, the ramp signal RAMP may decrease from a time point t3. The counter 151 may count the output Vcomp based on the counting clock signal CCLK from the time point t3 to a time point t4 at which a polarity of the output Vcomp of the comparison circuit 141 is changed. A counting value CV may increase from the time point t3 to the time point t4.

When the reset counting ends, for signal counting (e.g., counting an image signal of the pixel PX1), the offset may be applied to the ramp signal RAMP again at a time point t5, and then, bits of the counting value CV may be inverted in response to the invert signal CONV at a time point t6. At a time point t7, the transfer control signal TG may transit to the high level, and the transfer transistor TX1 may be turned on in response to the transfer control signal TG to transfer photocharges accumulated in the photodiode PD1 to the floating diffusion node FD1. Accordingly, the pixel signal PXS indicating the voltage level of the floating diffusion node FD1 may decrease.

From a time point t8, the ramp signal RAMP decreases. The counter 151 may count the output Vcomp based on the counting clock signal CCLK from the time point t8 to a time point t9 at which the polarity of the output Vcomp of the comparison circuit 141 is changed because a voltage level of the ramp signal RAMP is the same as a voltage level of the pixel signal PXS. The counting value CV may be output as the pixel data PXD. When the signal counting ends, the ADC 130 may be initialized.

Although an example in which a digital correlated double sampling scheme is applied to the ADC 130 is described in the inventive concept, the inventive concept is not limited thereto, and an analog correlated double sampling scheme may be applied to the ADC 130.

Figure 4:
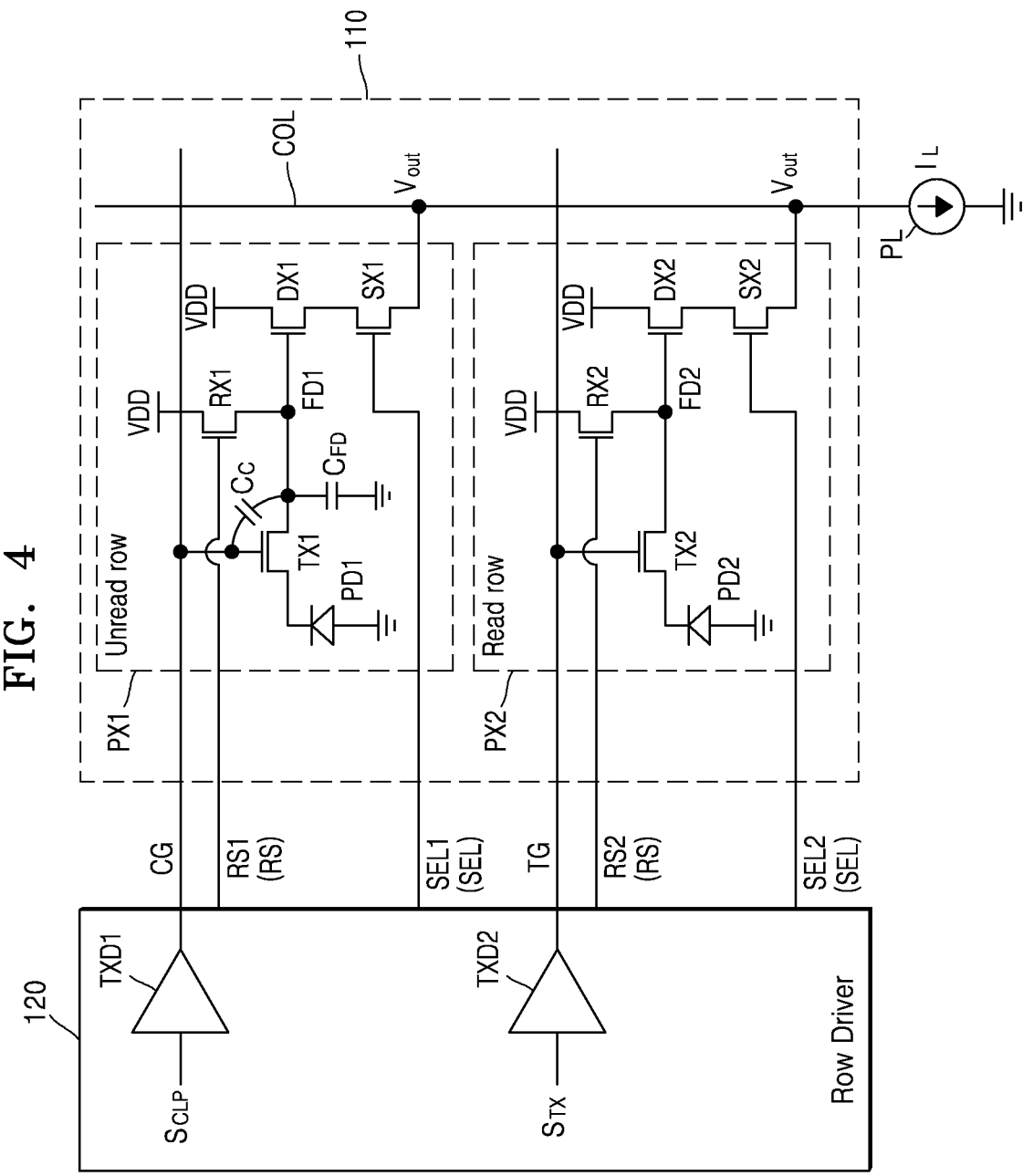
FIG. 4 is a circuit diagram illustrating a read operation of an image sensor, according to an exemplary embodiment of the inventive concept.
Figure 5A:
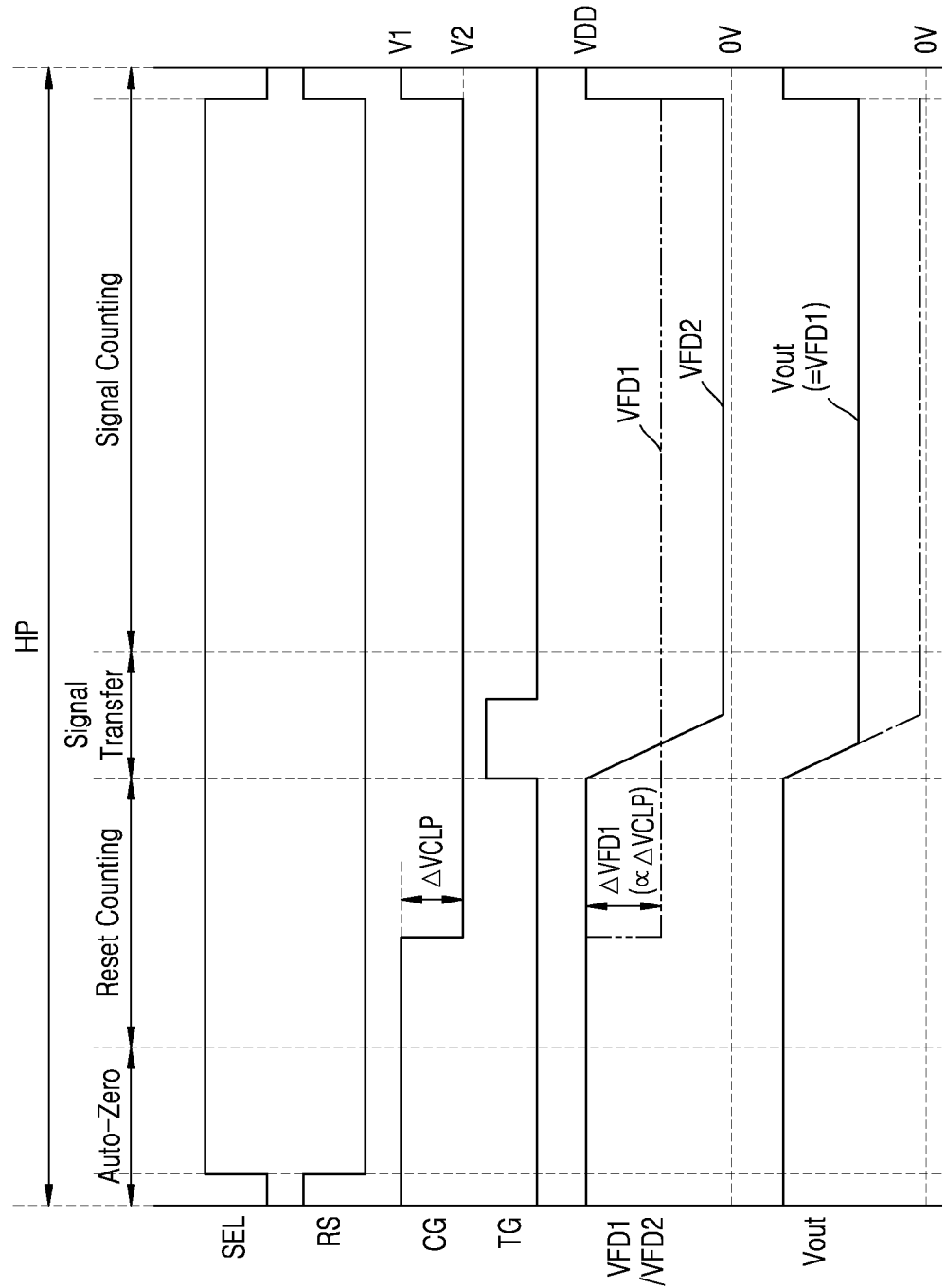
FIGS. 5A and 5B are timing diagrams of signals for a pixel array in a read operation of an image sensor, according to an exemplary embodiment of the inventive concept.
Figure 5B:
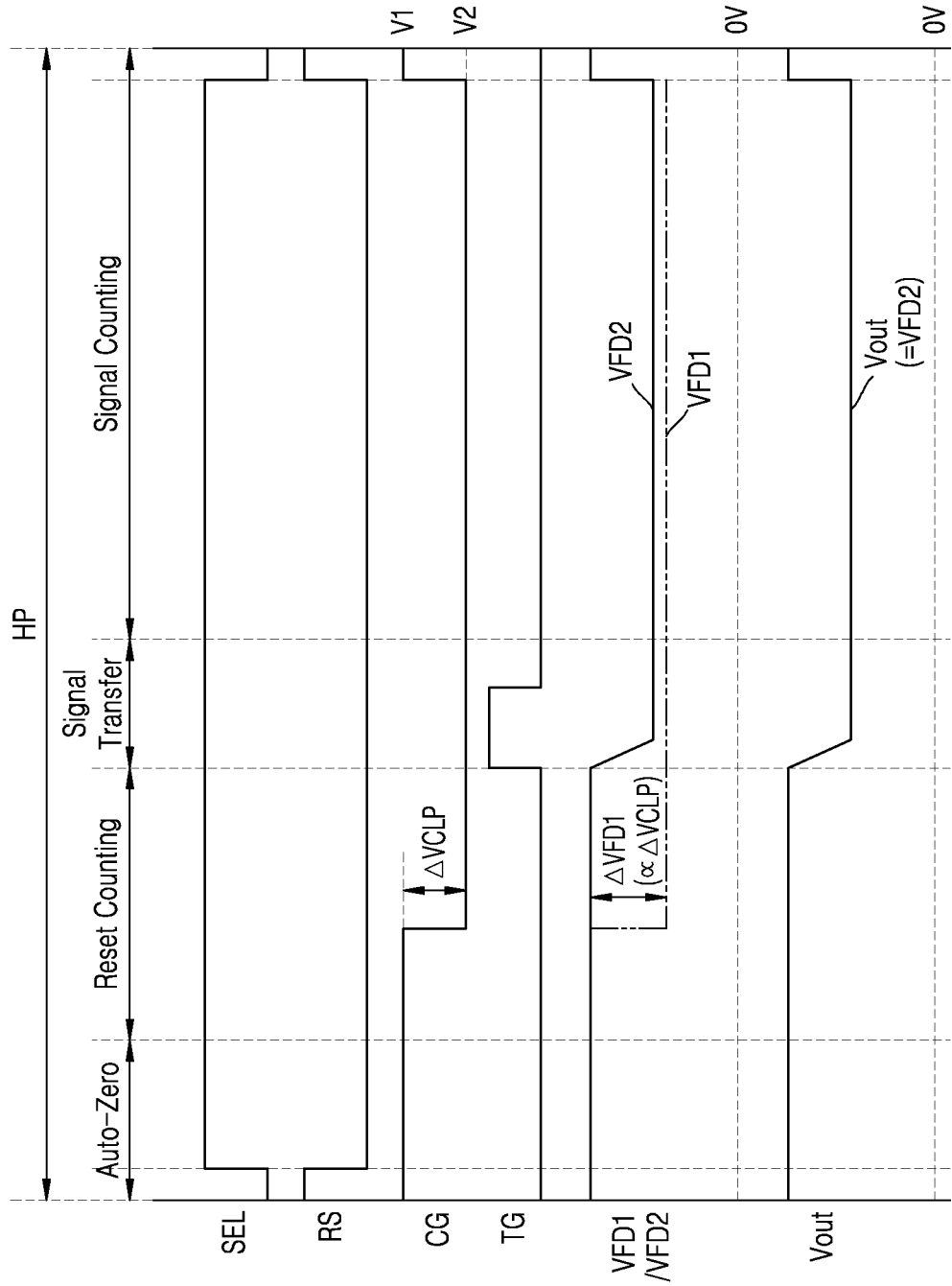

FIG. 4 is a circuit diagram illustrating a read operation of an image sensor, according to an exemplary embodiment of the inventive concept. FIGS. 5A and 5B are timing diagrams of signals for a pixel array in a read operation of an image sensor, according to an exemplary embodiment of the inventive concept.

Referring to FIG. 4, the first pixel PX1 and the second pixel PX2 may be arranged in different rows and connected to the same column COL. A read operation on the second pixel PX2 may be performed, and in this case, as described above with reference to FIG. 1, the first pixel PX1 in a row adjacent to a row in which the second pixel PX2 is arranged operates as a clamping pixel. In this case, the first pixel PX1 may be a pixel on which a read operation has ended or a dummy pixel.

The row driver 120 may provide control signals to the first pixel PX1 and the second pixel PX2 through a plurality of row lines. For example, the row driver 120 may provide the select signals SEL1 and SEL2, and the reset signals RS1 and RS2 to each of the first pixel PX1 and the second pixel PX2. Herein the same select signal SEL and the same reset signal RS may be provided to the first pixel PX1 and the second pixel PX2. The row driver 120 may provide the transfer control signal TG to the second pixel PX2 and provide a clamping control signal CG to the first pixel PX1.

The row driver 120 may include a first transfer driver TXD1 and a second transfer driver TXD2. The first transfer driver TXD1 and the second transfer driver TXD2 may be implemented using an amplifier, a buffer, or an inverter.

The first transfer driver TXD1 generates the clamping control signal CG and transfers the clamping control signal CG to the first pixel PX1. The first transfer driver TXD1 may generate the clamping control signal CG by buffering or level-converting a clamping reference signal $S_{CLP}$.

The second transfer driver TXD2 generates the transfer control signal TG and transfers the transfer control signal TG to the second pixel PX2. The second transfer driver TXD2 may generate the transfer control signal TG by buffering or level-converting a transfer reference signal $S_{TX}$.

Although FIG. 4 shows for convenience of description that the row driver 120 includes the first transfer driver TXD1 and the second transfer driver TXD2, the row driver 120 is not limited thereto, and the row driver 120 may further include other transfer drivers for transferring the select signal SEL and the reset signal RS to the first pixel PX1 and the second pixel PX2.

Referring to FIGS. 5A and 5B, a read period HP for one row may include an auto-zero period, a reset counting period, a signal transfer period, and a signal counting period.

At an initial stage of the read period HP, the reset transistors RX1 and RX2 are turned on in response to the reset signal RS of an activation level (e.g., the high level), such that the power source voltage VDD is applied to the floating diffusion nodes FD1 and FD2 of the first pixel PX1 and the second pixel PX2. Accordingly, voltages VFD1 and VFD2 of the floating diffusion nodes FD1 and FD2 (hereinafter, referred to as floating diffusion node voltages) may be the same as the power source voltage VDD. Thereafter, the reset signal RS transits to a deactivation level (e.g., the low level), and the select signal SEL transits to the activation level (e.g., the high level). In this case, the clamping control signal CG has the high level (e.g., a first voltage level V1), and then the clamping control signal CG transits to the low level (e.g., a second voltage level V2).

A parasitic capacitance $C_{FD}$ may be formed at the floating diffusion node FD1 in the first pixel PX1, and a coupling capacitor $C_C$ may be formed between the floating diffusion node FD1 and a gate terminal of the transfer transistor TX1. When the clamping control signal CG applied to the gate terminal of the transfer transistor TX1 transits from the high level to the low level, the floating diffusion node voltage VFD1 may decrease due to the coupling capacitor $C_C$. In this case, the floating diffusion node voltage VFD1 may be determined based on a voltage change of the clamping control signal CG. A voltage variation $\Delta VFD1$ of the floating diffusion node voltage VFD1 may be proportional to a voltage variation $\Delta VCLP$ of the clamping control signal CG (e.g., a difference between the first voltage level V1 and the second voltage level V2), and may be determined by capacitances of the parasitic capacitance $C_{FD}$ and the coupling capacitor $C_C$. The voltage variation $\Delta VFD1$ of the floating diffusion node voltage VFD1 may be represented by Mathematical formula 1.

$$\Delta VFD1 = \Delta VCLP \cdot \frac{C_C}{C_C + C_{FD}} \qquad \text{[Mathematical formula 1]}$$

Therefore, the more the voltage variation $\Delta VCLP$ of the clamping control signal CG, the less the floating diffusion node voltage VFD1.

In the signal transfer period, the transfer control signal TG has the activation level (e.g., the high level), and the transfer transistor TX2 of the second pixel PX2 is turned on in response to the transfer control signal TG to transfer photocharges generated by the photodiode PD2 to the floating diffusion node FD2. Accordingly, the floating diffusion node voltage VFD2 of the second pixel PX2 may decrease. Because both the select transistors SX1 and SX2 of the first and second pixels PX1 and PX2 are turned on, the floating diffusion node voltages VFD1 and VFD2 of the first and second pixels PX1 and PX2 may be output through the column line COL. In this case, an output voltage Vout, i.e., a pixel signal (PXS of FIG. 2), of the column line COL may be determined based on a higher voltage between the floating diffusion node voltages VFD1 and VFD2. This is described with reference to FIG. 6.

Figure 6:
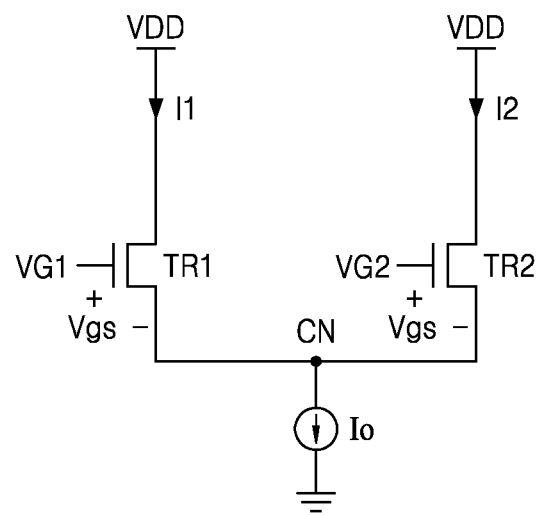
FIG. 6 is a circuit diagram of a winner-takes-all circuit.

FIG. 6 is a circuit diagram of a winner-takes-all circuit.

Referring to FIG. 6, the two transistors, e.g., first and second transistors TR1 and TR2, shown may correspond to a drive transistor DX included in a pixel according to an embodiment of the inventive concept. For example, the first and second transistors TR1 and TR2 may correspond to the first drive transistor DX1 included in the first pixel PX1 and the second drive transistor DX2 included in the second pixel PX2, respectively. Hereinafter, it is assumed for convenience of description that the first and second transistors TR1 and TR2 are implemented using a negative-channel metal-oxide semiconductor (NMOS) transistor.

When a first gate voltage VG1 is greater than a second gate voltage VG2, a voltage applied to a common node CN is the same as a value obtained by subtracting a gate-source voltage Vgs from the first gate voltage VG1. That is, VG1−Vgs=VCN. In addition, when the first gate voltage VG1 is greater than the second gate voltage VG2, a bias current Io may be a value based on a first current I1 regardless of a second current I2. Therefore, only a transistor having a larger gate voltage level may operate, and a transistor having a lower gate voltage level does not operate. A circuit that operated in this manner may be referred to as a winner-takes-all circuit. For example, referring to FIGS. 6 and 4, the principle that a voltage is applied to the common node CN in FIG. 6 is similar to the principle that a voltage is applied to the column line COL in FIG. 4. In this case, the first gate voltage VG1 and the second gate voltage VG2 of FIG. 6 may correspond to the floating diffusion node voltages VFD1 and VFD2 of FIG. 4, respectively. Therefore, a higher voltage between the floating diffusion node voltages VFD1 and VFD2 may be output through the column line COL. The output voltage Vout of the column line COL may correspond to a higher voltage between the floating diffusion node voltages VFD1 and VFD2.

Referring to FIGS. 5A and 5B, before the signal transfer period, because the floating diffusion node voltage VFD1 of the first pixel PX1 is less than or equal to the floating diffusion node voltage VFD2 of the second pixel PX2, the floating diffusion node voltage VFD2 of the second pixel PX2 may be output as the output voltage Vout.

Thereafter, as shown in FIG. 5A, when the floating diffusion node voltage VFD1 of the first pixel PX1 is greater than the floating diffusion node voltage VFD2 of the second pixel PX2 in the signal counting period because the floating diffusion node voltage VFD2 of the second pixel PX2 excessively decreases (e.g., close to 0 V) in the signal transfer period, the floating diffusion node voltage VFD1 of the first pixel PX1 may be output as the output voltage Vout. Therefore, the output voltage Vout may be prevented from excessively decreasing.

On the contrary, as shown in FIG. 5B, when the floating diffusion node voltage VFD2 of the second pixel PX2 is greater than the floating diffusion node voltage VFD1 of the first pixel PX1 in the signal counting period, the floating diffusion node voltage VFD2 of the second pixel PX2 may be output as the output voltage Vout.

The floating diffusion node voltage VFD1 of the first pixel PX1 may be less than a lower limit value of an input range of a comparison circuit (141 of FIG. 2). Accordingly, when the floating diffusion node voltage VFD2 of the second pixel PX2 is within the input range of the comparison circuit (141 of FIG. 2) (e.g., FIG. 5B), the floating diffusion node voltage VFD2 of the second pixel PX2 may be provided as the pixel signal PXS to the comparison circuit (141 of FIG. 2) such that a pixel data value of the second pixel PX2 may be read.

When the floating diffusion node voltage VFD2 of the second pixel PX2 excessively decreases and is out of the input range of the comparison circuit (141 of FIG. 2), the pixel data value of the second pixel PX2 may be output as the highest value. In this case, when a current source (PL of FIG. 2) is not able to normally operate due to the floating diffusion node voltage VFD2 of the second pixel PX2, band noise may occur. However, as described above, even when the floating diffusion node voltage VFD2 of the second pixel PX2 excessively decreases, the first pixel PX1 operates as a clamping circuit (e.g., FIG. 5A), and thus, the output voltage Vout may be prevented from excessively decreasing. Therefore, the occurrence of noise may be blocked. A lower limit value of the output voltage Vout may be referred to as a clamping level, and the clamping level may be determined by the floating diffusion node voltage VFD1 of the first pixel PX1.

As described above, an image sensor according to an exemplary embodiment of the inventive concept provides a clamping control signal to each of the pixels in an adjacent unread row, particularly, to a gate terminal of a transfer transistor included in each of the pixels in the unread row when a read operation on a read pixel in a read row is performed, thereby using the pixels in the unread row as a clamping circuit. Accordingly, by using pixels in an adjacent unread row as a clamping circuit without an additional wiring or circuit, the occurrence of noise may be suppressed without requiring an additional circuit area or increasing power consumption.

Figure 7A:
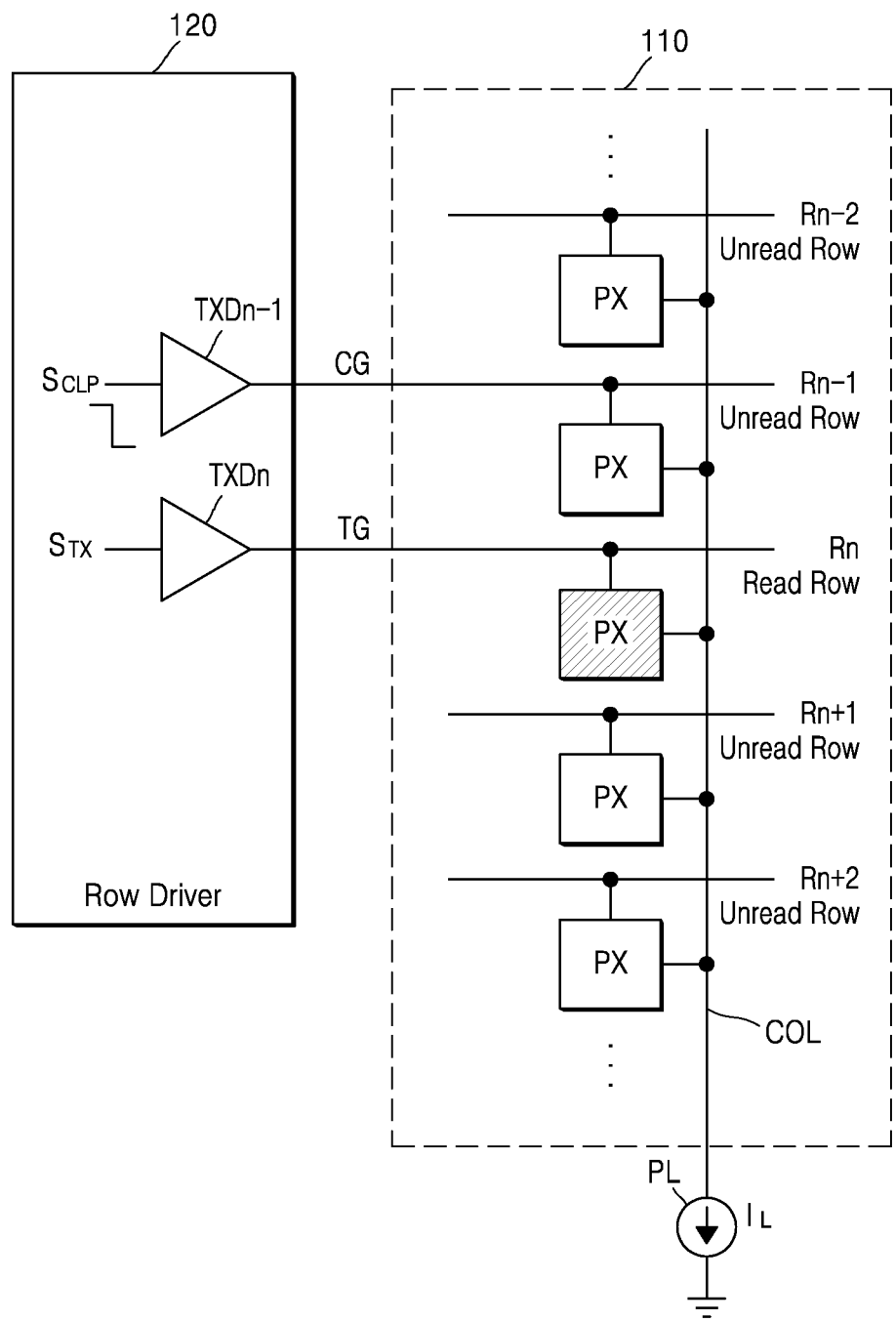
FIGS. 7A, 7B, and 7C are block diagrams illustrating a read operation of an image sensor, according to exemplary embodiments of the inventive concept.
Figure 7B:
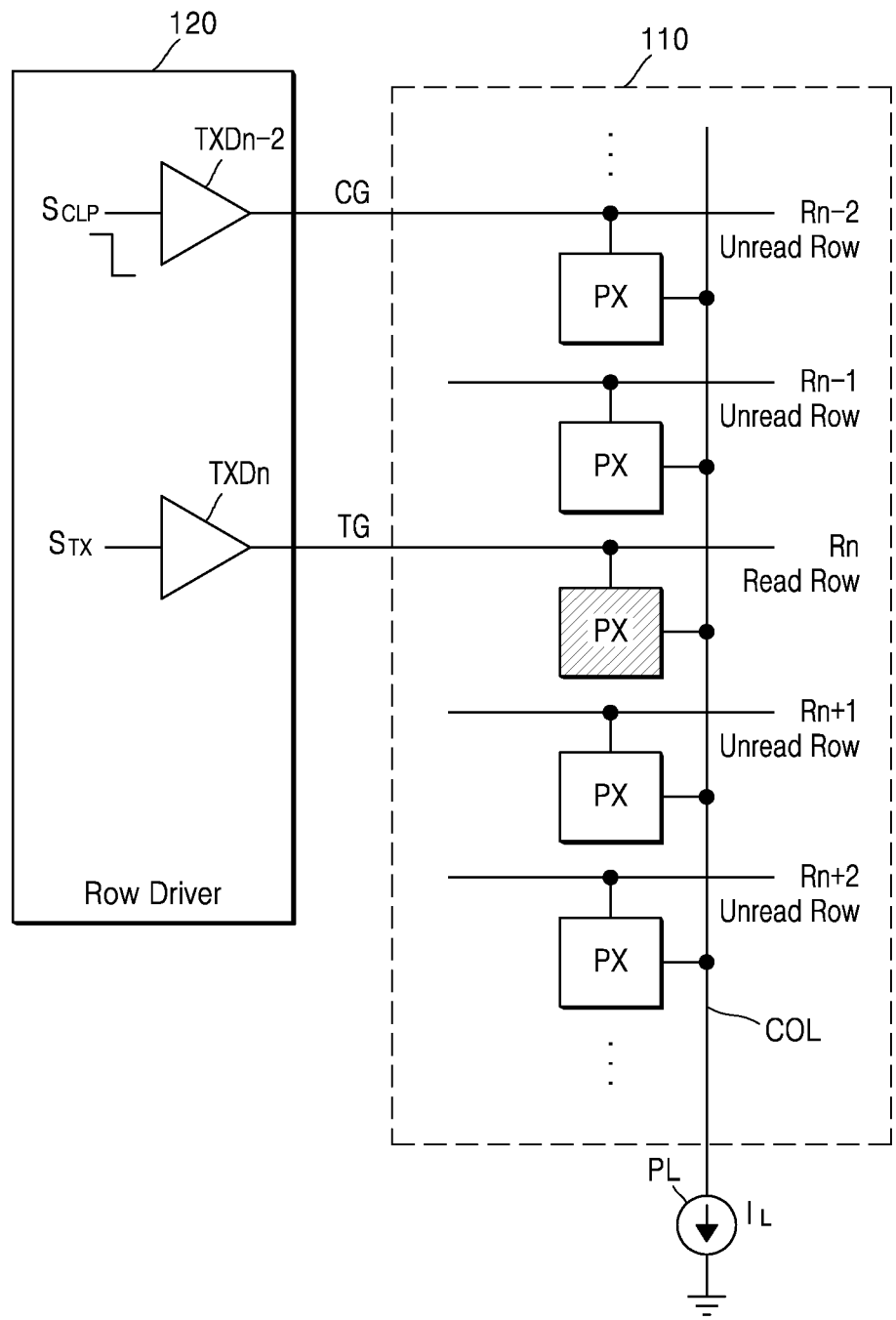
Figure 7C:
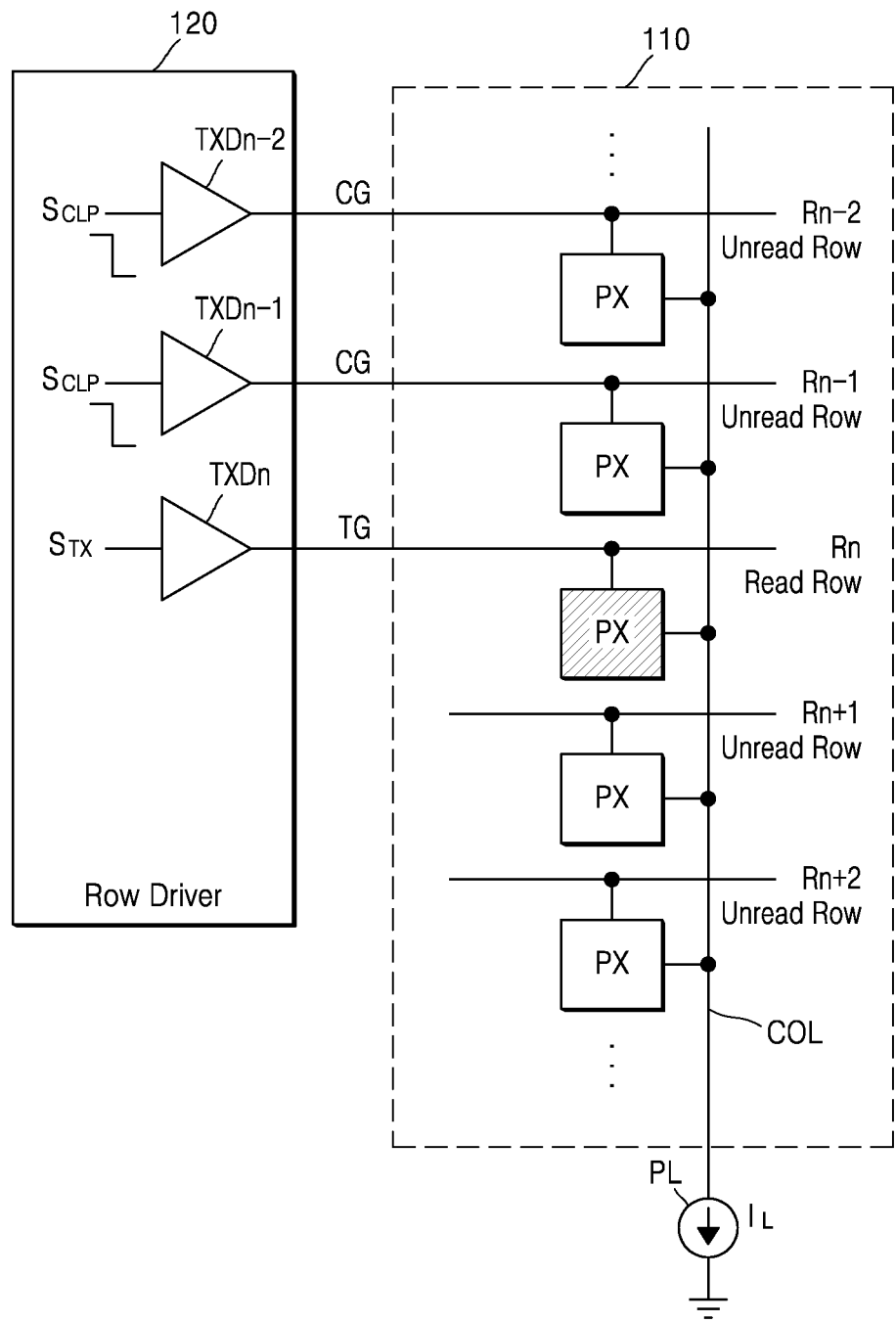

FIGS. 7A, 7B, and 7C are block diagrams illustrating a read operation of an image sensor, according to exemplary embodiments of the inventive concept. It is assumed in FIGS. 7A, 7B, and 7C that an $n^{th}$ row Rn is a read row. Although FIGS. 7A, 7B, and 7C show that one pixel is arranged in each of rows Rn−2 to Rn+2, this is for convenience of description, and as shown in FIG. 1, a plurality of pixels may be arranged in each of the rows Rn−2 to Rn+2, and the same control signals may be applied to the plurality of pixels arranged in the same row.

Referring to FIGS. 7A, 7B, and 7C, when a read operation is performed on a pixel of a read row (i.e., the $n^{th}$ row Rn), a pixel connected to the same column line COL as the read pixel is connected to, and arranged in an unread row operates as a clamping pixel. According to an exemplary embodiment of the inventive concept, a clamping row may be a row for which a read operation has ended.

Referring to FIG. 7A, an unread row most adjacent to a read row may operate as a clamping row. For example, when the $n^{th}$ row Rn is a read row, an $(n-1)^{th}$ row Rn−1 for which a read operation has ended among unread rows most adjacent to the $n^{th}$ row Rn may operate as a clamping row.

An $n^{th}$ transfer driver TXDn included in the row driver 120 may transfer the transfer control signal TG to a pixel PX in the $n^{th}$ row Rn, and an $(n-1)^{th}$ transfer driver TXDn−1 may transfer the clamping control signal CG to a pixel PX in the $(n-1)^{th}$ row Rn−1. As described with reference to FIGS. 5A and 5B, the clamping control signal CG may transit from the high level to the low level before the signal transfer period, and the transfer control signal TG may have the high level in the signal transfer period of the read period HP and have the low level in the remaining period thereof.

Referring to FIG. 7B, at least one row among unread rows adjacent to a read row may operate as a clamping row. According to an embodiment of the inventive concept, as shown in FIG. 7B, an unread row is arranged between a read row and a clamping row. For example, when the $n^{th}$ row Rn is a read row, an $(n-2)^{th}$ row Rn−2 may operate as a clamping row.

The $n^{th}$ transfer driver TXDn included in the row driver 120 may transfer the transfer control signal TG to the pixel PX in the $n^{th}$ row Rn, and an $(n-2)^{th}$ transfer driver TXDn−2 may transfer the clamping control signal CG to a pixel PX in the $(n-2)^{th}$ row Rn−2.

Referring to FIG. 7C, a plurality of unread rows operate as clamping rows. For example, the $(n-2)^{th}$ row Rn-2 and the $(n-1)^{th}$ row Rn-1 prior to the $n^{th}$ row Rn that is a read row operate as clamping rows. However, the present embodiment is not limited thereto, and three or more rows may operate as clamping rows.

The $n^{th}$ transfer driver TXDn included in the row driver 120 may transfer the transfer control signal TG to the pixel PX in the $n^{th}$ row Rn, and the $(n-2)^{th}$ transfer driver TXDn-2 and the $(n-1)^{th}$ transfer driver TXDn-1 may transfer the clamping control signal CG to the pixels PX in the $(n-2)^{th}$ row Rn-2 and the $(n-1)^{th}$ row Rn-1, respectively.

Figure 8A:
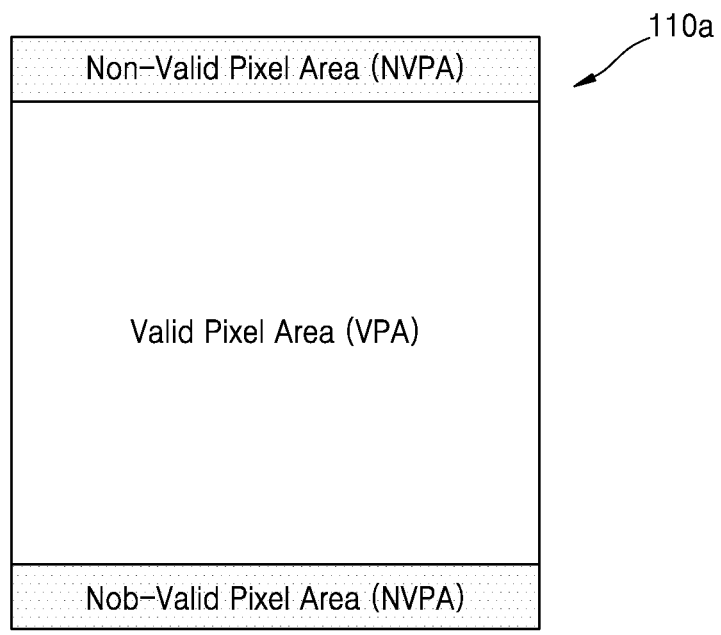
FIG. 8A illustrates a pixel array according to an exemplary embodiment of the inventive concept.
Figure 8B:
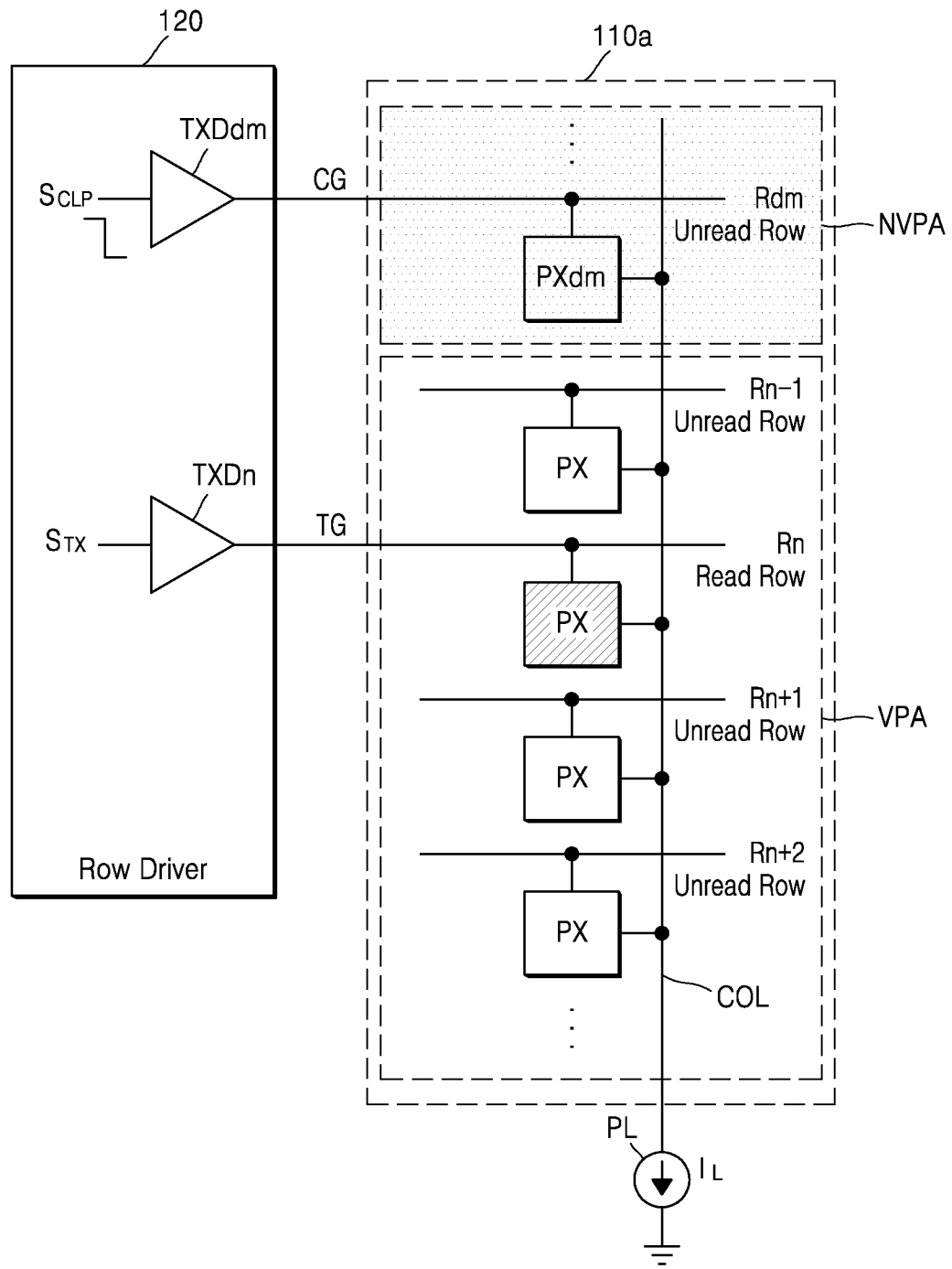
FIG. 8B is a block diagram illustrating a read operation of an image sensor, according to an exemplary embodiment of the inventive concept.

FIG. 8A illustrates a pixel array 110a according to an exemplary embodiment of the inventive concept, and FIG. 8B is a block diagram illustrating a read operation of an image sensor, according to an exemplary embodiment of the inventive concept.

Referring to FIG. 8A, the pixel array 110a includes a valid pixel area VPA and a non-valid pixel area NVPA. Each of the valid pixel area VPA and the non-valid pixel area NVPA may include a plurality of rows. Although FIG. 8A shows that the non-valid pixel area NVPA is located at the top and the bottom of the pixel array 110a, the non-valid pixel area NVPA is not limited thereto and may be arranged at the top or the bottom of the pixel array 110a or between a plurality of valid pixel areas VPA.

An image sensor may generate image data based on pixel signals output from pixels in the valid pixel area VPA. Pixel signals output from pixels in the non-valid pixel area NVPA may be used for various purposes such as characteristic analysis, noise cancellation, and data correction.

Referring to FIG. 8B, a row (e.g., a dummy row Rdm) in the non-valid pixel area NVPA may be used as a clamping row. When a read operation on a pixel PX in an $n^{th}$ row is performed, the dummy row Rdm may be used as a clamping row. In addition, when a read operation on each of other rows in the valid pixel area VPA, e.g., an $(n-1)^{th}$ row, an $(n+1)^{th}$ row, and an $(n+2)^{th}$ row, is performed, at least one dummy row Rdm may be used as a clamping row.

According to an exemplary embodiment of the inventive concept, as shown in FIG. 8A, the non-valid pixel area NVPA may be located at the top and the bottom of the pixel array 110a, and when a read operation for rows in the valid pixel area VPA is performed, a dummy row Rdm most adjacent to a read row among a plurality of dummy rows Rdm included in the non-valid pixel area NVPA at the top and the bottom of the pixel array 110a may operate as a clamping row. The dummy row Rdm includes a dummy pixel PXdm. In an exemplary embodiment, the dummy pixel PXdm does not output a PXS signal.

Figure 9:
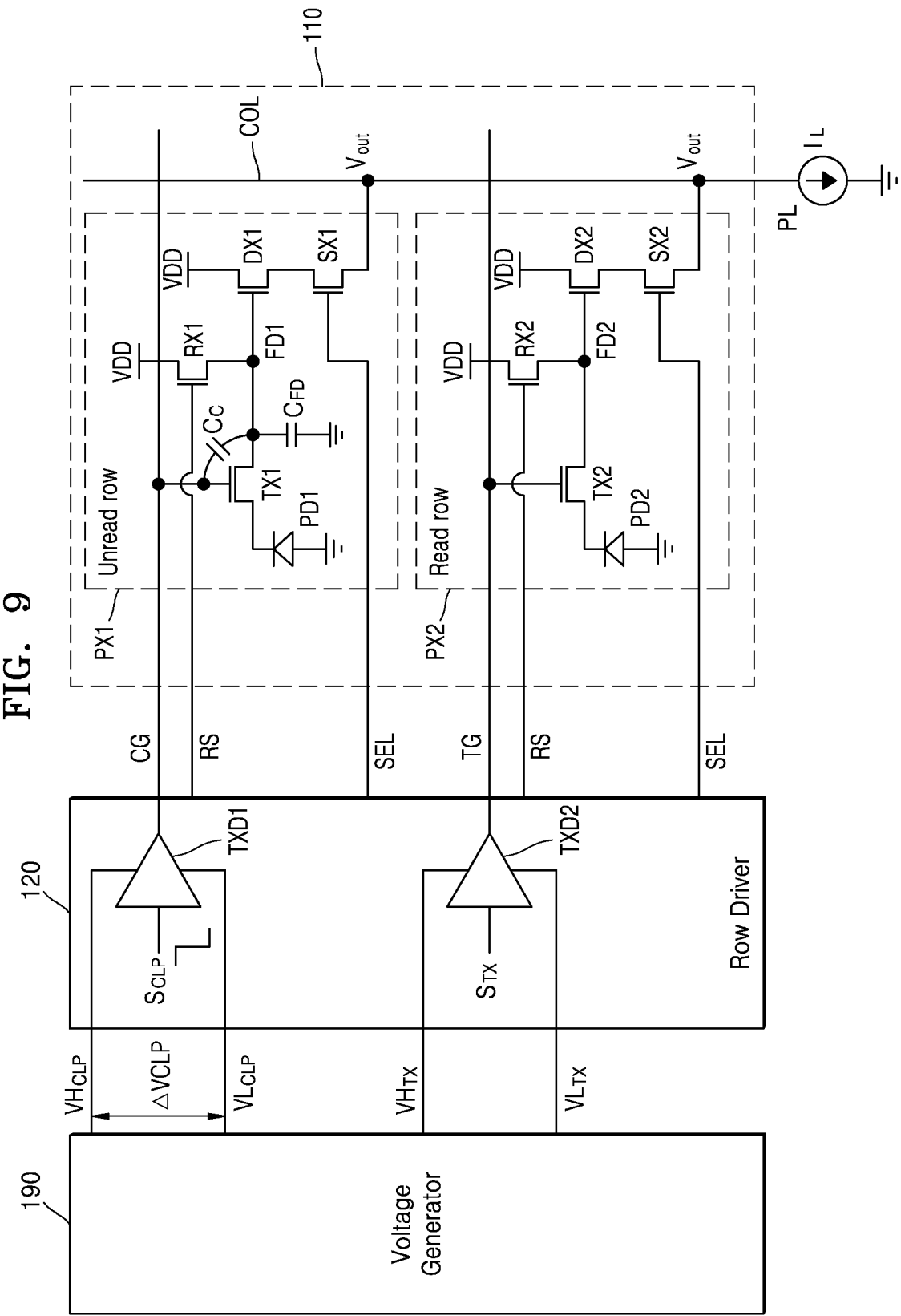
FIG. 9 is a circuit diagram illustrating a read operation of an image sensor, according to an exemplary embodiment of the inventive concept.

FIG. 9 is a circuit diagram illustrating a read operation of an image sensor, according to an exemplary embodiment of the inventive concept.

Referring to FIG. 9, when a read operation on the second pixel PX2 is performed, the first pixel PX1 operates as a clamping circuit. The first transfer driver TXD1 included in the row driver 120 may transfer the clamping control signal CG to the first pixel PX1. In this case, the first transfer driver TXD1 may operate based on a first clamping voltage $VH_{CLP}$ and a second clamping voltage $VL_{CLP}$. The first clamping voltage $VH_{CLP}$ is greater than the second clamping voltage $VL_{CLP}$. The first transfer driver TXD1 may generate the clamping control signal CG by amplifying (buffering or level-converting) the clamping reference signal $S_{CLP}$ based on the first clamping voltage $VH_{CLP}$ or the second clamping voltage $VL_{CLP}$. Therefore, the high level of the clamping control signal CG may be the same as or similar to a voltage level of the first clamping voltage $VH_{CLP}$, and the low level thereof may be the same as or similar to a voltage level of the second clamping voltage $VL_{CLP}$.

The second transfer driver TXD2 may operate based on a first transfer voltage $VH_{TX}$ and a second transfer voltage $VL_{TX}$. The first transfer voltage $VH_{TX}$ is greater than the second transfer voltage $VL_{TX}$. The second transfer driver TXD2 may generate the transfer control signal TG by amplifying (buffer or level-convert) the transfer reference signal $S_{TX}$ based on the first transfer voltage $VH_{TX}$ or the second transfer voltage $VL_{TX}$. Therefore, the high level of the transfer control signal TG may be the same as or similar to a voltage level of the first transfer voltage $VH_{TX}$, and the low level thereof may be the same as or similar to a voltage level of the second transfer voltage $VL_{TX}$.

When a read operation on the first pixel PX1 is performed, the first transfer driver TXD1 generates the transfer control signal TG based on the first transfer voltage $VH_{TX}$ and the second transfer voltage $VL_{TX}$ and transfers the transfer control signal TG to the first pixel PX1. In addition, when the second pixel PX2 operates as a clamping pixel, the second transfer driver TXD2 generates the clamping control signal CG based on the first clamping voltage $VH_{CLP}$ and the second clamping voltage $VL_{CLP}$ and transfers the clamping control signal CG to the second pixel PX2.

According to an embodiment of the inventive concept, the image sensor include a voltage generator 190, and the voltage generator 190 generates the first clamping voltage $VH_{CLP}$, the second clamping voltage $VL_{CLP}$, the first transfer voltage $VH_{TX}$, and the second transfer voltage $VL_{TX}$ and provides the first clamping voltage $VH_{CLP}$, the second clamping voltage $VL_{CLP}$, the first transfer voltage $VH_{TX}$, and the second transfer voltage $VL_{TX}$ to the row driver 120. The voltage generator 190 may generate the first clamping voltage $VH_{CLP}$, the second clamping voltage $VL_{CLP}$, the first transfer voltage $VH_{TX}$, and the second transfer voltage $VL_{TX}$ at a preset level or variably change voltage levels of the first clamping voltage $VH_{CLP}$, the second clamping voltage $VL_{CLP}$, the first transfer voltage $VH_{TX}$, and the second transfer voltage $VL_{TX}$ based on received voltage control signals.

According to an embodiment of the inventive concept, the first clamping voltage $VH_{CLP}$ is the same as the first transfer voltage $VH_{TX}$, and the second clamping voltage $VL_{CLP}$ is the same as the second transfer voltage $VL_{TX}$. For example, the first clamping voltage $VH_{CLP}$ and the first transfer voltage $VH_{TX}$ may be an analog power source voltage of the image sensor, and the second clamping voltage $VL_{CLP}$ and the second transfer voltage $VL_{TX}$ may be a ground voltage.

According to another embodiment of the inventive concept, the first clamping voltage $VH_{CLP}$ differs from the first transfer voltage $VH_{TX}$, and the second clamping voltage $VL_{CLP}$ differs from the second transfer voltage $VL_{TX}$.

A voltage difference between the first clamping voltage $VH_{CLP}$ and the second clamping voltage $VL_{CLP}$ may correspond to the voltage variation ΔVCLP of the clamping control signal CG, and as described with reference to mathematical formula 1, the voltage variation ΔVFD1 of the floating diffusion node voltage VFD1 of the first pixel PX1 may be proportional to the voltage variation ΔVCLP of the clamping control signal CG, and a clamping level may be determined based on the voltage variation ΔVFD1 of the floating diffusion node voltage VFD1 of the first pixel PX1. Therefore, as the voltage variation ΔVCLP of the clamping control signal CG increases, the clamping level may decrease, and as voltage variation ΔVCLP of the clamping control signal CG decreases, the clamping level may increase. The voltage generator 190 may adjust voltage levels of the first clamping voltage $VH_{CLP}$ and the second clamping voltage $VL_{CLP}$ based on received voltage control signals so as to generate a targeted clamping level.

Figure 10A:
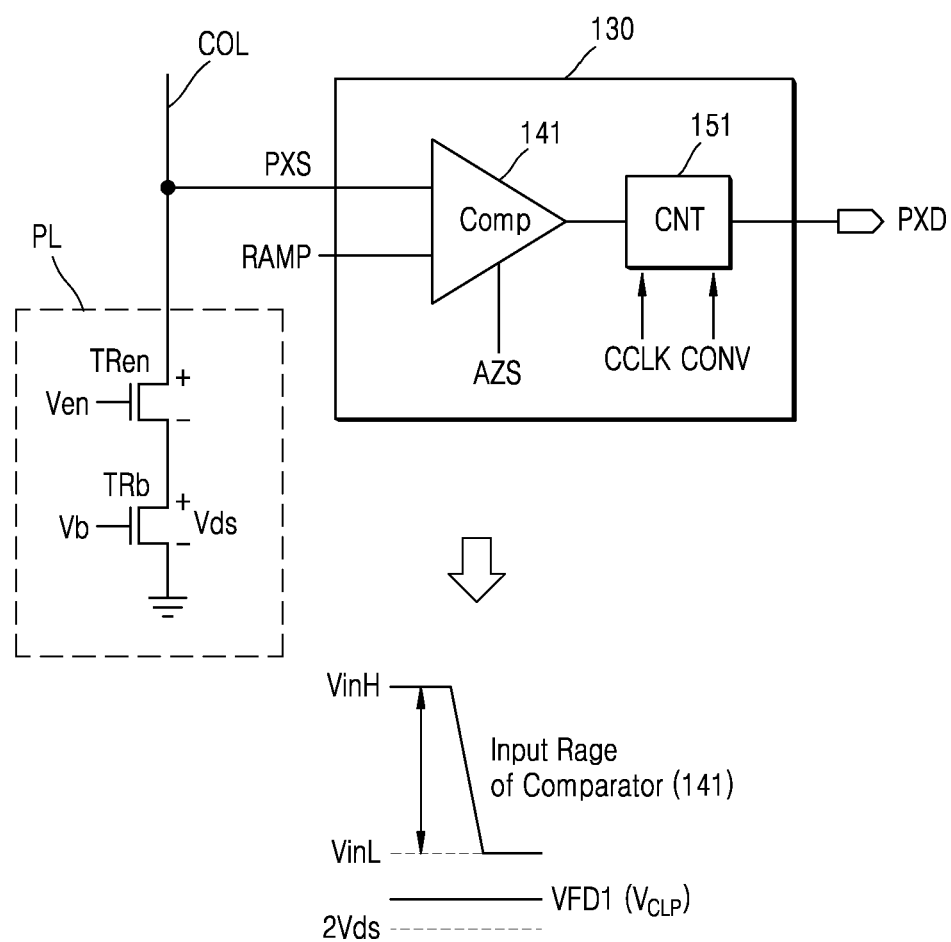
FIG. 10A illustrates a clamping level according to an exemplary embodiment of the inventive concept.
Figure 10B:
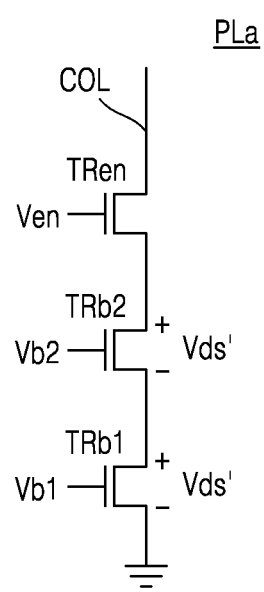
FIG. 10B is a circuit diagram of one example of a current source according to an exemplary embodiment of the inventive concept.

FIG. 10A illustrates a clamping level according to an exemplary embodiment of the inventive concept. FIG. 10B is a circuit diagram of one example of a current source according to an exemplary embodiment of the inventive concept.

Referring to FIG. 10A, a minimum value (i.e., a clamping level $V_{CLP}$) of a column line COL may be determined based on the input range of the comparison circuit 141 and an operating range of the current source PL. The input range of the comparison circuit 141 may be between a first input voltage VinH and a second input voltage VinL. In this case, when the clamping level $V_{CLP}$ is set to be less than the input range of the comparison circuit 141, the comparison circuit 141 receives a pixel signal PXS from a read pixel.

The current source PL may be implemented using a bias transistor TRb and an enable transistor TRen connected in series. When the enable transistor TRen is turned on in response to an enable signal Ven, the bias transistor TRb sinks a current based on a bias voltage Vb. For example, the enable signal Ven is applied to a gate terminal of the enable transistor TRen and the bias voltage Vb is applied to a gate terminal of the bias transistor TRb. In this case, when a voltage of the column line COL is less than a minimum operating voltage of the current source PL (i.e., a voltage required for the current source PL to normally operate), the current source PL is not able to normally operate. The minimum operating voltage of the current source PL may be a drain-source voltage Vds of the bias transistor TRb. In this case, a drain-source voltage of the enable transistor TRen may be almost 0 V. Therefore, the clamping level $V_{CLP}$ that is a minimum voltage level of the column line COL may be set to be greater than Vds.

According to an embodiment of the inventive concept, as shown in FIG. 10B, a current source PLa may be implemented using at least two bias transistors TRb1 and TRb2 and the enable transistor TRen connected in series. A minimum operating voltage of the current source PLa may be 2*Vds', which is a sum of drain-source voltages Vds' of the two bias transistors TRb1 and TRb2. Therefore, the clamping level $V_{CLP}$ that is the minimum voltage level of the column line COL may be set to be greater than 2*Vds'.

As described with reference to FIGS. 10A and 10B, in an exemplary embodiment, the clamping level $V_{CLP}$ is set to be less than the input range of the comparison circuit 141 and greater than the operating voltage of the current source PL.

Figure 11:
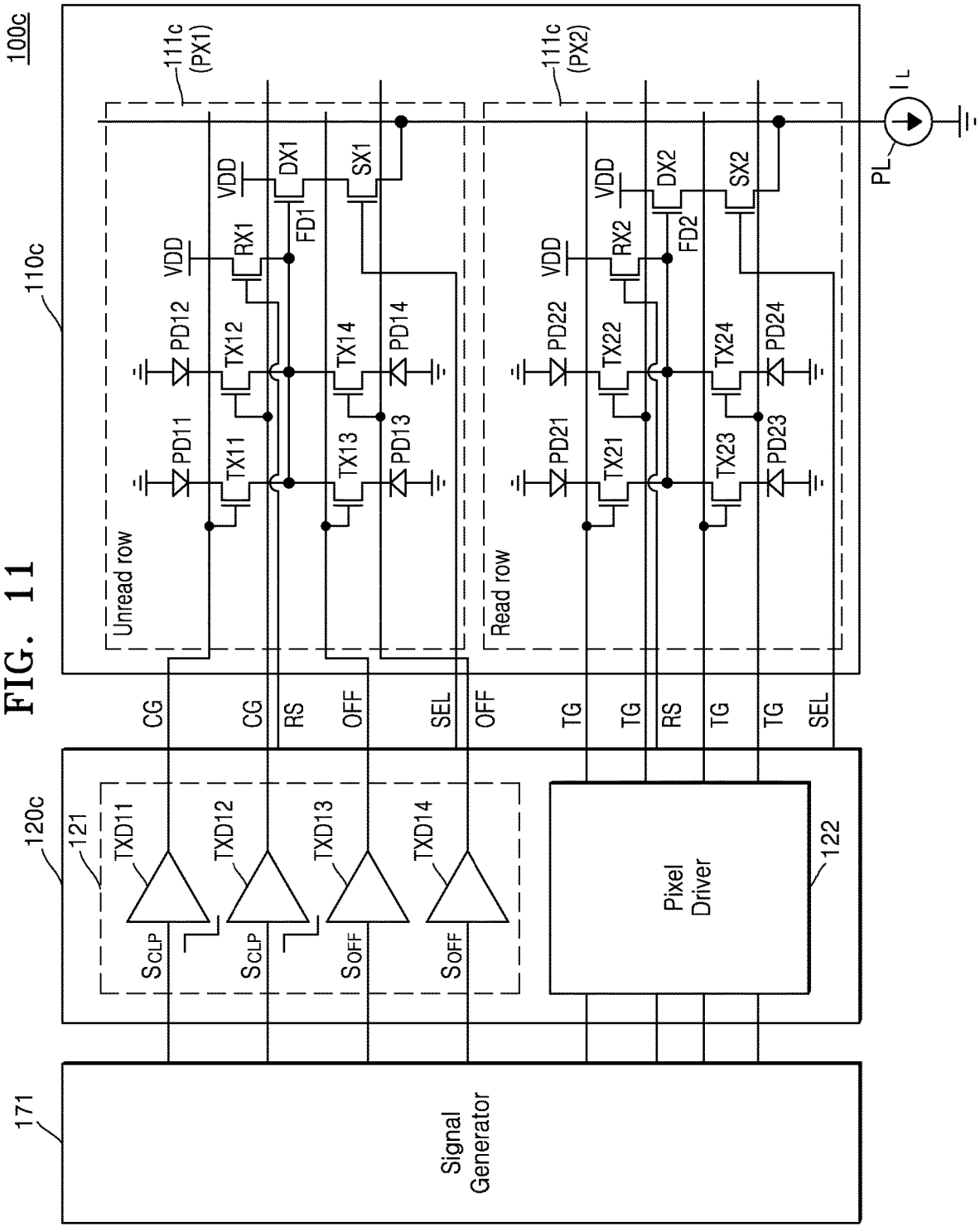
FIG. 11 is a circuit diagram of an image sensor and illustrates a read operation of the image sensor, according to an exemplary embodiment of the inventive concept.
Figure 12:
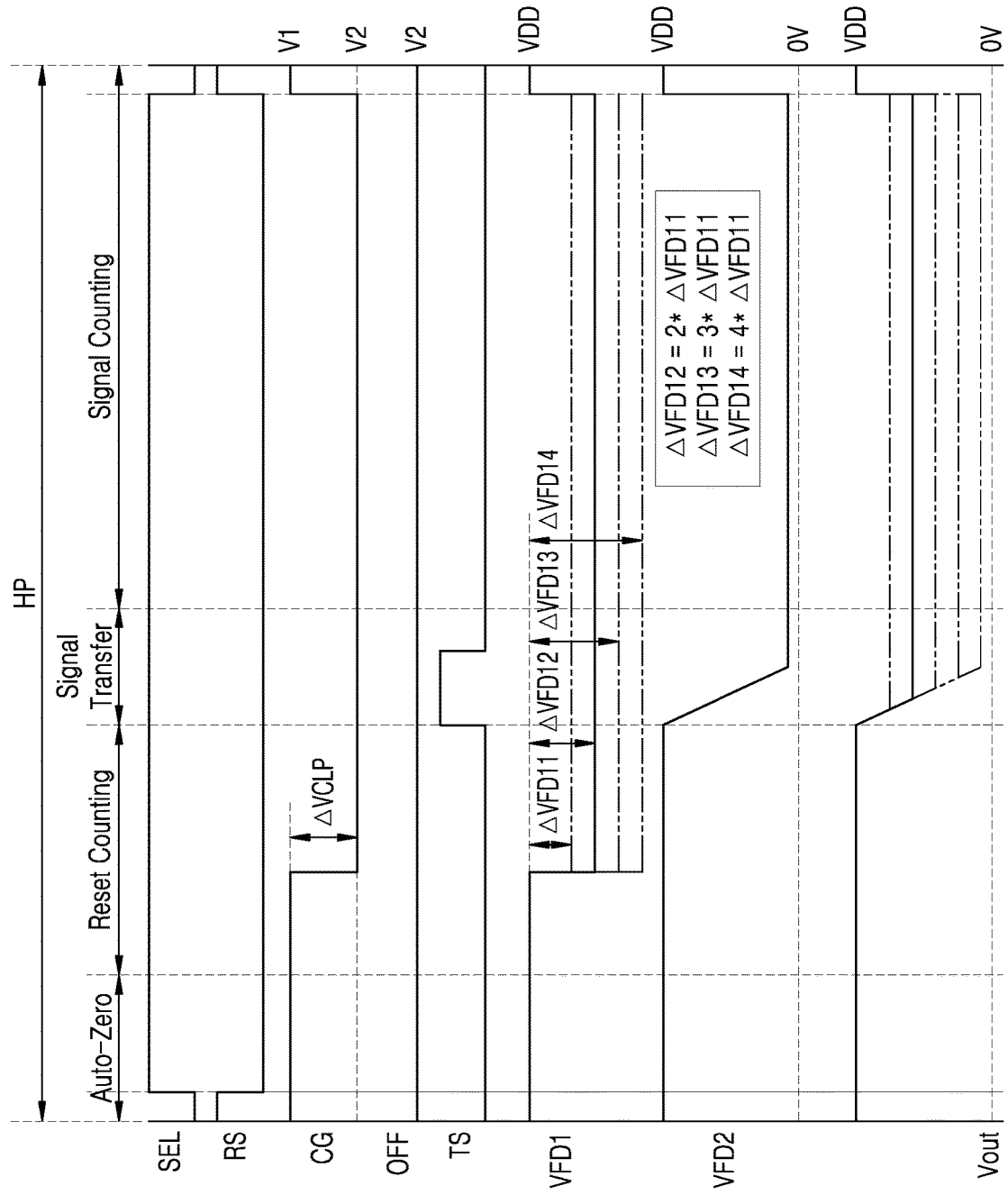
FIG. 12 is a timing diagram of signals for a pixel array in the read operation of the image sensor of FIG. 11.

FIG. 11 is a circuit diagram of an image sensor 100c and illustrates a read operation of the image sensor 100c, according to an exemplary embodiment of the inventive concept. FIG. 12 is a timing diagram of signals for a pixel array 110c in the read operation of the image sensor 100c of FIG. 11.

Referring to FIG. 11, the image sensor 100c includes the pixel array 110c, a row driver 120c (e.g., a driving circuit), and a signal generator 171. According to an exemplary embodiment of the inventive concept, the signal generator 171 is included in the timing generator 170. However, the signal generator 171 is not limited thereto and may be implemented as a separate circuit from the timing generator 170. The image sensor 100c may further include other components described with reference to FIG. 1.

Pixels 111c included in the pixel array 110c, e.g., the first pixel PX1, may include a plurality of photosensitive elements PD11, PD12, PD13, and PD14, a plurality of transfer transistors, e.g., first to fourth transfer transistors TX11, TX12, TX13, and TX14, a reset transistor RX1, a drive transistor DX1, and a select transistor SX1. The plurality of transfer transistors TX11, TX12, TX13, and TX14 may be respectively connected to the plurality of photosensitive elements PD11, PD12, PD13, and PD14 and may also be commonly connected to the drive transistor DX1. As such, a structure in which the plurality of photosensitive elements PD11, PD12, PD13, and PD14 are connected to one drive transistor may be referred to as a multi-shared structure.

Although FIG. 11 shows that one pixel 111c includes four photosensitive elements PD11, PD12, PD13, and PD14 and four transfer transistors TX11, TX12, TX13, and TX14, the pixel 111c is not limited thereto, and the number of photosensitive elements and the number of transfer transistors may be variably changed.

When a read operation is performed on the second pixel PX2, the first pixel PX1 operates as a clamping circuit. The reset signal RS may be applied to the respective reset transistors RX1 and RX2 of the first and second pixels PX1 and PX2, and the select signal SEL may be applied to the respective select transistors SX1 and SX2 thereof. The transfer control signal TG may be applied to a plurality of transfer transistors TX21, TX22, TX23, and TX24 in the second pixel PX2. According to an embodiment of the inventive concept, the transfer control signal TG may be applied to some of the plurality of transfer transistors TX21, TX22, TX23, and TX24 in the second pixel PX2.

In an exemplary embodiment, the clamping control signal CG is applied to at least one of the plurality of transfer transistors TX11, TX12, TX13, and TX14 in the first pixel PX1, and a blocking control signal OFF is applied to the remaining transfer transistors. Although FIG. 11 shows as an example where the clamping control signal CG is applied to the first and second transfer transistors TX11 and TX12 in the first pixel PX1, and the blocking control signal OFF is applied to the third and fourth transfer transistors TX13 and TX14 therein, embodiments of the present disclosure are not limited thereto, and the clamping control signal CG may be applied to at least one transfer transistor. For example, the clamping control signal CG may be applied to all of the plurality of transfer transistors TX11, TX12, TX13, and TX14. The blocking control signal OFF may have a certain level during a read operation on the first pixel PX1. According to an exemplary embodiment of the inventive concept, the level of the blocking control signal OFF is the same as the low level of the clamping control signal CG.

The plurality of transfer transistors TX11, TX12, TX13, and TX14 share the floating diffusion node FD1. Therefore, when the first pixel PX1 is used as a clamping pixel, a voltage variation of the floating diffusion node voltage VFD1 may be variably changed based on the number of transfer transistors to which the clamping control signal CG is applied among the plurality of transfer transistors TX11, TX12, TX13, and TX14. In other words, the low level of the floating diffusion node voltage VFD1 may be variably changed.

Referring to FIG. 12, in an exemplary embodiment, the voltage variation of the floating diffusion node voltage VFD1 is proportional to the number of transfer transistors to which the clamping control signal CG is applied. For example, when the clamping control signal CG is applied to one transfer transistor, and the blocking control signal OFF is applied to the other transfer transistors, that is, when the one transfer transistor is used for clamping, the voltage variation of the floating diffusion node voltage VFD1 is ΔVFD11. When two transfer transistors are used for clamping, the voltage variation of the floating diffusion node voltage VFD1 is 2*ΔVFD11, and when three transfer transistors are used for clamping, the voltage variation of the floating diffusion node voltage VFD1 is 3*ΔVFD11. When four transfer transistors are used for clamping, the voltage variation of the floating diffusion node voltage VFD1 is 4*ΔVFD11. In other words, the greater the number of transfer transistors used for clamping in a clamping pixel (e.g., the first pixel PX1), the greater the voltage variation of the floating diffusion node voltage VFD1. Accordingly, as the number of transfer transistors used for clamping increases, the lower limit value (e.g., the clamping level) of the output voltage Vout may decrease.

Referring back to FIG. 11, the row driver 120c may include a first driver 121 (e.g., a driving circuit) configured to drive a row in which the first pixel PX1 is located (i.e., a clamping row) and a second driver 122 configured to drive a row in which the second pixel PX2 is located (i.e., a read row). The first driver 121 may include first to fourth transfer drivers TXD11, TXD12, TXD13, and TXD14 configured to drive the first to fourth transfer transistors TX11, TX12, TX13, and TX14, respectively. For example, each of the first to fourth transfer drivers TXD11, TXD12, TXD13, and TXD14 could be implemented with an operational amplifier. The first to fourth transfer drivers TXD11, TXD12, TXD13, and TXD14 may generate the clamping control signal CG and the blocking control signal OFF by buffering or level-converting the clamping reference signal $S_{CLP}$ or a blocking reference signal $S_{OFF}$ provided from the signal generator 171.

The signal generator 171 may generate input signal, (e.g., the clamping reference signal $S_{CLP}$ and a blocking reference signal $S_{OFF}$) to be provided to the first to fourth transfer drivers TXD11, TXD12, TXD13, and TXD14 and adjust the number of clamping reference signals $S_{CLP}$. Accordingly, the number of transfer transistors to be used for clamping in a clamping pixel (e.g., the first pixel PX1) may be adjusted.

According to an exemplary embodiment of the inventive concept, when a pixel has the multi-shared structure, the image sensor 100c adjusts a clamping level by adjusting the number of transfer transistors to be used for clamping. In addition, as described above with reference to FIG. 9, a method of adjusting the clamping level by adjusting the first and second levels of the clamping control signal CG may be combined with the embodiment having the multi-shared structure.

Figure 13:
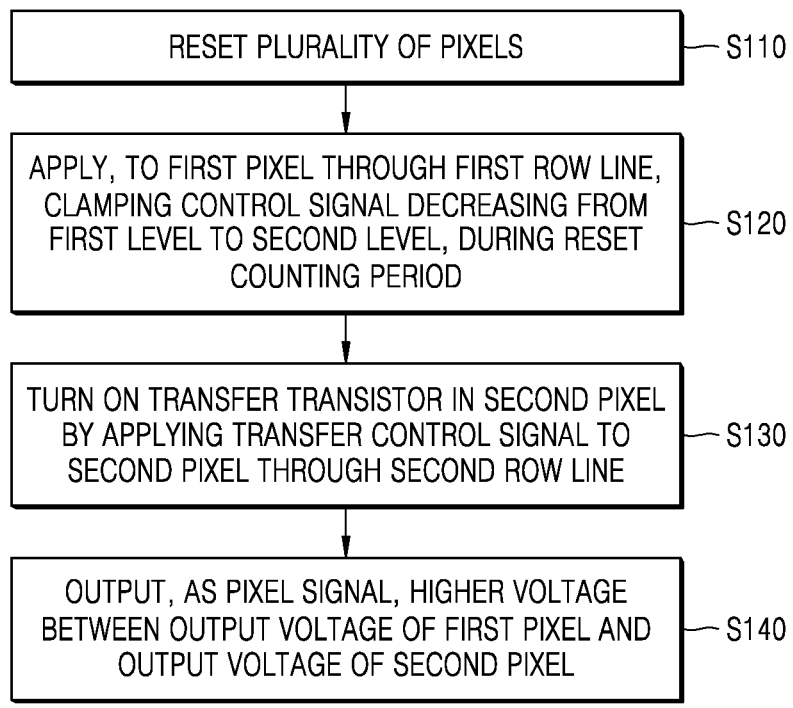
FIG. 13 is a flowchart of an operation method of an image sensor, according to an exemplary embodiment of the inventive concept.

FIG. 13 is a flowchart of an operation method of an image sensor, according to an exemplary embodiment of the inventive concept. The operation method of the image sensor in FIG. 13 may be performed by the image sensor 100 or 100c of FIG. 1 or 12, and thus, the above-described operation methods of an image sensor may be applied to the present embodiment.

FIG. 13 illustrates a method performed by the image sensor including first and second pixels connected to a same column line. The first pixel is used as a clamping circuit when a read operation is performed on the second pixel. In this case, the first and second pixels may be arranged in different rows, and according to an exemplary embodiment of the inventive concept, the first pixel may be a pixel on which a read operation has ended and may be a pixel adjacent to the second pixel, or a dummy pixel.

Referring to FIG. 13, a plurality of pixels in a pixel array of the image sensor are reset in response to a reset signal in operation S110. Thereafter, a read operation may be performed in row units of the pixel array.

In a reset counting period, a clamping control signal decreasing from the first level to the second level is applied to the first pixel through a first row line in operation S120. The clamping control signal may be applied to a gate terminal of a transfer transistor in the first pixel. A voltage level of a floating diffusion node of the first pixel may decrease due to a parasitic capacitance between the gate terminal of the transfer transistor and the floating diffusion node. A voltage variation of a floating diffusion node voltage may be variably changed based on a difference between the first level and the second level. For example, the greater the difference between the first level and the second level, the greater the voltage variation of the floating diffusion node voltage, and accordingly, the floating diffusion node voltage may further decrease. In an exemplary embodiment, the floating diffusion node voltage of the first pixel is less than an input range of a comparison circuit (141 of FIG. 2) of an ADC and greater than a voltage for a current source (PL of FIG. 2) connected to the column line to normally operate (e.g., a sum of source-drain voltages of transistors included in the current source).

Thereafter, in a signal transfer period, a transfer control signal of the activation level is applied to the second pixel through a second row line, and a transfer transistor in the second pixel is turned on in response to the transfer control signal in operation S130. In this case, the activation level of the transfer control signal may be the same as or different from the first level of the clamping control signal.

A higher voltage between an output voltage of the first pixel and an output voltage of the second pixel is output as a pixel signal through the column line in operation S140. An output voltage of a pixel may indicate a floating diffusion node voltage of the pixel. Therefore, the pixel signal may be determined based on a higher voltage between a floating diffusion node voltage of the first pixel and a floating diffusion node voltage of the second pixel. Before the signal transfer period, the floating diffusion node voltage of the second pixel may be higher than or equal to the floating diffusion node voltage of the first pixel. Therefore, the floating diffusion node voltage of the second pixel may be output as the pixel signal. Thereafter, in the signal transfer period, the floating diffusion node voltage of the second pixel may decrease in response to inflow of photocharges generated by a photosensitive element to a floating diffusion node in the second pixel. When the floating diffusion node voltage of the second pixel excessively decreases and is less than the floating diffusion node voltage of the first pixel, the floating diffusion node voltage of the first pixel may be output as the pixel signal, thereby preventing band noise from occurring when the pixel signal excessively decreases.

Figure 14:
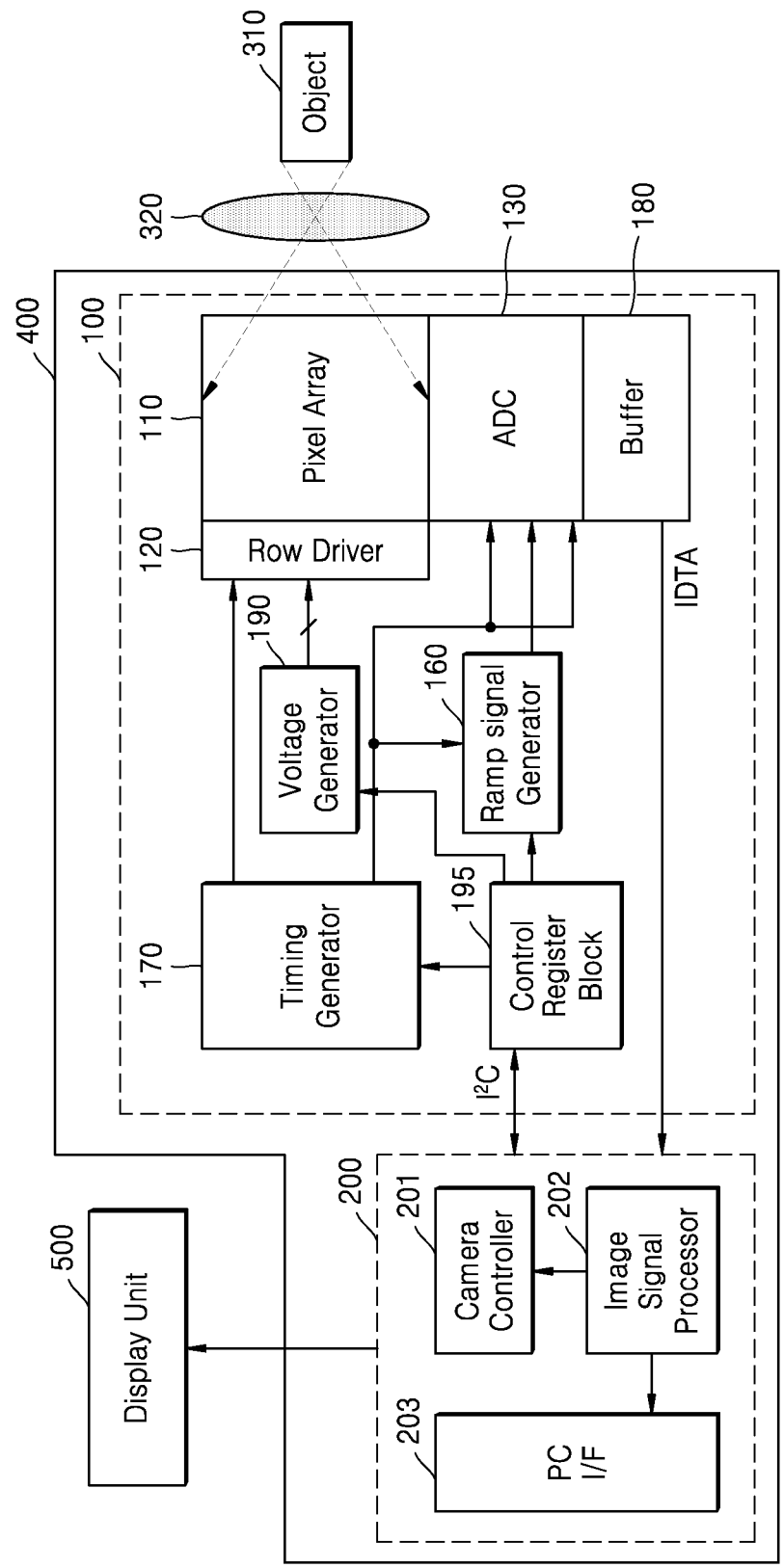
FIG. 14 is a block diagram of an image processing system according to an exemplary embodiment of the inventive concept.

FIG. 14 is a block diagram of an image processing system 400 according to an exemplary embodiment of the inventive concept.

Referring to FIG. 14, the image processing system 400 according to an exemplary embodiment of the inventive concept include the image sensor 100, an image processor 200, a display unit 500 (e.g., a display device), and a lens 320.

The image sensor 100 includes the pixel array 110, the row driver 120, the ramp signal generator 160, the timing generator 170, a control register block 195, and the buffer 180.

The image sensor 100 may sense an object 310 photographed through the lens 320 under control of the image processor 200, and the image processor 200 may output an image sensed and output by the image sensor 100 to the display unit 500. In this case, the display unit 500 includes all components capable of outputting or presenting an image. For example, the display unit 500 may include a computer, a cellular phone, and other image output terminals.

The image processor 200 include a camera controller 201 (e.g., a control circuit), an image signal processor 202, and a personal computer interface (PC I/F) 203. The camera controller 201 may control the control register block 195. For example, the camera controller 201 may control the image sensor 100, i.e., the control register block 195, by using an inter-integrated circuit (I2C). However, the present embodiment is not limited thereto, and various interfaces may be applied between the camera controller 201 and the control register block 195.

The image signal processor 202 receives image data IDTA that is an output signal of the buffer 180, processes the image data IDTA into a processed image that can be viewed by a user as an image, and outputs the processed image to the display unit 500. Alternatively, the image signal processor 202 may receive a control signal from an external host through the PC I/F 203 and provide the processed image to the external host.

The image sensor 100 may be implemented by any one of the image sensors 100 and 100c described with reference to FIGS. 1 and 12. The control register block 195 may output a control signal to each of the ramp signal generator 160, the timing generator 170, the buffer 180, and the voltage generator 190 to control an operation thereof. In this case, the control register block 195 may operate based on control of the camera controller 201.

The pixel array 110, the row driver 120, the ADC 130, the timing generator 170, the buffer 180, the ramp signal generator 160, and the voltage generator 190 have been described in detail with reference to the drawings above, and thus, a repeated description thereof is omitted herein. When a read operation is performed in the pixel array 110, pixels in an unread row adjacent to a read row may be used as clamping pixels (i.e., a clamping circuit). In addition, before a signal transfer period, a clamping signal decreasing from the first level to the second level may be applied to a gate terminal of a transfer transistor of a clamping pixel, and a floating diffusion node voltage may decrease in response to the decrease in the clamping signal due to a parasitic capacitance between the gate terminal of the transfer transistor and a floating diffusion node. A voltage level of the floating diffusion node voltage may be used as a clamping level. When a floating diffusion node voltage of a read pixel excessively decreases, a floating diffusion node voltage of the clamping pixel may be output as a pixel signal. Accordingly, the pixel signal may be prevented from excessively decreasing, thereby suppressing the occurrence of band noise.

While the inventive concept has been particularly shown and described with reference to embodiments thereof, it will be understood that various changes in form and details may be made therein without departing from the spirit and scope of the inventive concept.

What is claimed is:

1. An image sensor comprising:
    a pixel array comprising a first pixel and a second pixel, each of the first pixel and the second pixel comprising at least one photosensitive element, and a switching element configured to transmit charges generated by the at least one photosensitive element to a floating diffusion node, wherein the first pixel and the second pixel are connected to a same column line; and
    a row driver circuit configured to provide a clamping control signal to the switching element in the first pixel that transitions from a first level to a second level that is less than the first level, during a reset counting period of a read period of the second pixel, and
    wherein the row driver circuit is configured to provide a transfer control signal of an activation level to the switching element of the second pixel during a signal transfer period of the read period after the reset counting period.

2. The image sensor of claim 1, wherein a pixel voltage output from the column line is determined based on a relatively higher voltage between a voltage of a first floating diffusion node in the first pixel and a voltage of a second floating diffusion node in the second pixel.

3. The image sensor of claim 1, wherein the row driver circuit is further configured to provide the transfer control signal to a first switching element in the second pixel, and the first switching element is turned on in response to the transfer control signal of a third level after the clamping control signal transits to the second level, such that the charges generated by the at least one photosensitive element are transferred to a second floating diffusion node in the second pixel.

4. The image sensor of claim 3, wherein the first level is the same as the third level.

5. The image sensor of claim 3, wherein the row driver circuit comprises:
    a first transfer driver circuit configured to generate the clamping control signal based on a first voltage of the first level and a second voltage of the second level and output the clamping control signal to a first row line connected to the first pixel; and
    a second transfer driver circuit configured to generate the transfer control signal based on a third voltage of the third level and a fourth voltage of a fourth level that is less than the third level and output the transfer control signal to a second row line connected to the second pixel, wherein the first level is different from the third level.

6. The image sensor of claim 1, wherein a voltage of a first floating diffusion node in the first pixel decreases based on a difference between the first level and the second level of the clamping control signal.

7. The image sensor of claim 1, wherein each of the first pixel and the second pixel comprises a plurality of photosensitive elements, and a plurality of switching elements configured to transfer charges generated by the plurality of photosensitive elements to the floating diffusion node, respectively, and the row driver circuit is further configured to provide the clamping control signal to at least one switching element among the plurality of switching elements in the first pixel.

8. The image sensor of claim 7, wherein the row driver circuit is further configured to transfer a blocking control signal of a certain level to at least one other switching element among the plurality of switching elements in the first pixel.

9. The image sensor of claim 1, wherein the first pixel and the second pixel are arranged in different rows, and the first pixel is arranged in a row most adjacent to a row in which the second pixel is arranged.

10. The image sensor of claim 1, wherein the first pixel is a dummy pixel arranged in a non-valid pixel area of the pixel array.

11. The image sensor of claim 1, wherein the pixel array further comprises a third pixel connected to the same column line as the first pixel and the second pixel are connected to, and the row driver circuit is further configured to provide the clamping control signal to each of the switching element in the first pixel and a switching element in the third pixel during the read period of the second pixel.

12. The image sensor of claim 1, further comprising:
a current source connected to the column line and configured to sink a load current from the column line; and
a comparator configured to compare a pixel voltage output from the column line to a ramp signal to generate a comparison result, wherein a voltage of a first floating diffusion node in the first pixel decreases to a clamping level in response to the clamping control signal, and the clamping level is less than a lower limit value of an input range of the comparator and greater than an operating voltage of the current source.

13. An image sensor comprising:
a pixel array comprising a first pixel and a second pixel connected to a same column line; a row driver circuit configured to provide control signals to the pixel array;
a voltage generation circuit configured to provide driving voltages to the row driver circuit for driving the first and second pixels;
a ramp signal generator configured to generate a ramp signal;
an analog-to-digital converter (ADC) configured to convert a pixel voltage received from the column line into a pixel data value based on the ramp signal; and
a timing signal generator configured to control the row driver circuit, the ramp signal generator, and the ADC,
wherein the row driver circuit sequentially applies a clamping control signal of a first level and of a second level that is less than the first level to a switching element in the first pixel when a read operation is performed on the second pixel, and
wherein the clamping control signal decreases from the first level to the second level before a signal transfer period in which a charge transfer signal of an activation level is applied to a switching element in the second pixel.

14. The image sensor of claim 13, wherein the switching element of the first pixel comprises a charge transfer transistor connected to a photosensitive element and a gate terminal of a drive transistor in the first pixel, and the clamping control signal is applied to a gate terminal of the charge transfer transistor.

15. The image sensor of claim 13, wherein each of the first pixel and the second pixel comprises:
a photosensitive element configured to generate photocharges corresponding to a received optical signal;
a first transistor configured to reset a floating diffusion node;
a second transistor configured to transfer the photocharges to the floating diffusion node;
a third transistor configured to output a voltage corresponding to a voltage of the floating diffusion node; and
a fourth transistor configured to output an output of the third transistor to the column line in response to a select signal, wherein the second transistor is used as the switching element.

16. The image sensor of claim 13, wherein the row driver circuit is further configured to receive a first voltage of the first level, a second voltage of the second level, a third voltage of a third level, and a fourth voltage of a fourth level, generate the clamping control signal based on the first voltage and the second voltage, and generate the charge transfer signal based on the third voltage and the fourth voltage, wherein the third level is greater than the fourth level, and wherein the first level is different from the third level.

17. The image sensor of claim 13, wherein a minimum value of the pixel voltage is determined based on the first level and the second level.

18. The image sensor of claim 15, wherein each of the first pixel and the second pixel comprises a plurality of photosensitive elements and a plurality of switching elements configured to transfer photocharges generated by the plurality of photosensitive elements to the floating diffusion node, respectively, and the row driver circuit is further configured to provide the clamping control signal to at least one switching element among the plurality of switching elements in the first pixel.

19. An operation method of an image sensor comprising a pixel array comprising first and second pixels arranged in different rows and connected to a same column line, the operation method comprising:
resetting the pixel array;
applying a clamping control signal to the first pixel during a reset counting period when a read operation is performed on the second pixel, the clamping control signal decreasing from a first level to a second level during the reset counting period; and
applying a transfer control signal of an activation level to the second pixel during a signal transfer period after the reset counting period.

* * * * *